United States Patent
Westfall et al.

(10) Patent No.: US 10,744,396 B2
(45) Date of Patent: Aug. 18, 2020

(54) CONFIGURABLE TRANSPORTATION STRUCTURE

(71) Applicant: Ford Global Technologies, LLC, Dearborn, MI (US)

(72) Inventors: Christopher Robert Westfall, San Francisco, CA (US); Melvin Alfredo Dominguez, San Bruno, CA (US); Kilian Vas, Cologne (DE); Tobias Ricke, Cologne (DE); Uwe Wagner, Wermelskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/132,681

(22) Filed: Sep. 17, 2018

(65) Prior Publication Data

US 2019/0009163 A1    Jan. 10, 2019

Related U.S. Application Data

(63) Continuation-in-part of application No. PCT/US2016/042407, filed on Jul. 15, 2016, and a
(Continued)

(51) Int. Cl.
*A63C 17/12* (2006.01)
*B62D 51/02* (2006.01)
(Continued)

(52) U.S. Cl.
CPC ............ *A63C 17/12* (2013.01); *A63C 17/011* (2013.01); *A63C 17/014* (2013.01);
(Continued)

(58) Field of Classification Search
CPC ... A63C 17/12; A63C 17/011; A63C 2203/22; A63C 17/014; A63C 2203/24;
(Continued)

(56) References Cited

U.S. PATENT DOCUMENTS 3,064,750 A    11/1962  Buchwald
4,621,825 A *  11/1986  Lee .................... A63C 17/01
                                                    280/218
(Continued)

FOREIGN PATENT DOCUMENTS

CN       201193080 Y     2/2009
CN       201862241 U     6/2011
(Continued)

OTHER PUBLICATIONS

Notification of Transmittal of International Search Report and Written Opinion dated Oct. 20, 2016 regarding International Application No. PCT/US2016/042407(14 pages).
(Continued)

*Primary Examiner* — Jacob B Meyer
(74) *Attorney, Agent, or Firm* — Brandon Hicks; Bejin Bieneman PLC

(57) ABSTRACT

A system includes a support structure that includes a bottom surface and a connector plate pivotably connected to the bottom surface, and a device including a wheel, the device being releaseably connectable to the connector plate.

11 Claims, 17 Drawing Sheets

Related U.S. Application Data continuation-in-part of application No. PCT/US2016/045098, filed on Aug. 2, 2016.

(60) Provisional application No. 62/311,593, filed on Mar. 22, 2016.

(51) Int. Cl.
| | |
|---|---|
| *A63C 17/01* | (2006.01) |
| *B62D 61/04* | (2006.01) |
| *B60L 3/00* | (2019.01) |
| *B60L 53/14* | (2019.01) |
| *B60L 53/12* | (2019.01) |
| *B62D 47/00* | (2006.01) |

(52) U.S. Cl.
CPC ............ *B60L 3/0015* (2013.01); *B60L 53/12* (2019.02); *B60L 53/14* (2019.02); *B62D 51/02* (2013.01); *B62D 61/04* (2013.01); *A63C 2203/18* (2013.01); *A63C 2203/22* (2013.01); *A63C 2203/24* (2013.01); *B60L 2200/16* (2013.01); *B60L 2200/24* (2013.01); *B60L 2220/42* (2013.01); *B60L 2220/46* (2013.01); *B60L 2240/622* (2013.01); *B60L 2250/16* (2013.01); *B62D 47/00* (2013.01)

(58) Field of Classification Search
CPC .... A63C 2203/18; B62D 47/00; B62D 61/04; B62D 51/02; B60L 2220/46; B60L 3/0015; B60L 53/14; B60L 53/12; B60L 2200/24; B60L 2200/16; B60L 2250/16; B60L 2220/42; B60L 2240/622
See application file for complete search history.

(56) References Cited

U.S. PATENT DOCUMENTS

| | | | | |
|---|---|---|---|---|
| 4,679,977 A * | 7/1987 | Minami | ................. | B62D 61/04 198/574 |
| 5,062,630 A * | 11/1991 | Nelson | ............... | A63B 21/0004 280/87.042 |
| 5,201,659 A * | 4/1993 | Nelson | ............... | A63B 21/0004 280/87.042 |
| 6,095,267 A | 8/2000 | Goodman | | |
| D430,635 S * | 9/2000 | Danache | ...................... | D21/765 |
| 6,380,849 B1 * | 4/2002 | Eckstine | ................ | B66C 13/46 340/436 |
| 6,467,560 B1 * | 10/2002 | Anderson | ............ | A63C 17/01 180/181 |
| 6,758,483 B1 * | 7/2004 | Sypniewski | ............ | B62M 1/00 280/87.041 |
| 7,073,805 B2 * | 7/2006 | Yan | ......................... | B62M 1/30 280/221 |
| 7,210,544 B2 | 5/2007 | Kamen et al. | | |
| 7,216,876 B2 * | 5/2007 | Cole | ....................... | A63C 17/01 280/43.23 |
| 7,226,062 B1 * | 6/2007 | Stefano | ................. | A63C 17/01 280/87.041 |
| 7,237,784 B1 * | 7/2007 | Monteleone | ........... | A63C 17/01 280/87.03 |
| 7,690,659 B2 * | 4/2010 | Wilt | ....................... | A63C 17/01 188/4 R |
| 7,905,304 B2 * | 3/2011 | Adachi | ................... | B66F 9/063 180/12 |
| 8,016,732 B2 * | 9/2011 | Susnjara | ............ | A63B 21/0004 482/142 |
| 9,022,154 B2 * | 5/2015 | Sato | .................... | A63C 17/011 180/181 |
| 9,033,088 B2 * | 5/2015 | Salek | ....................... | B60N 2/00 180/168 |
| 9,597,978 B1 * | 3/2017 | Konchitsky | ........ | A63C 17/0046 |
| 9,616,294 B2 * | 4/2017 | Kramer | ............ | A63B 21/00058 |
| 9,682,732 B2 * | 6/2017 | Strack | .................. | B62K 11/007 |
| 9,694,709 B1 * | 7/2017 | Konchitsky | ............. | B60L 13/04 |
| 9,844,719 B1 * | 12/2017 | Huang | .................. | A63C 17/12 |
| 9,956,472 B2 * | 5/2018 | Sugata | ................. | A63C 17/011 |
| 10,010,759 B2 * | 7/2018 | Kramer | ................ | A63B 21/055 |
| 10,052,520 B2 * | 8/2018 | Kramer | ............ | A63B 21/4033 |
| 10,300,364 B2 * | 5/2019 | Wen | ....................... | A63C 17/011 |
| 10,300,783 B2 * | 5/2019 | Calleija | ................ | B60K 7/0015 |
| 10,486,052 B2 * | 11/2019 | Choi | .................... | B60K 7/0007 |
| 2004/0016584 A1 * | 1/2004 | Kamen | ................ | B62K 11/007 180/218 |
| 2004/0055267 A1 * | 3/2004 | Wright | ................. | A01D 34/001 56/16.7 |
| 2005/0205310 A1 | 9/2005 | Pelz | | |
| 2006/0207839 A1 * | 9/2006 | Wilt | ........................ | A63C 17/01 188/1.12 |
| 2008/0034534 A1 * | 2/2008 | Zarbi | ....................... | A47L 11/26 16/30 |
| 2009/0288900 A1 * | 11/2009 | Takenaka | ............. | B62K 11/007 180/218 |
| 2010/0013194 A1 * | 1/2010 | Booker | .................. | A63C 10/14 280/629 |
| 2014/0224559 A1 * | 8/2014 | Salek | ....................... | B60N 2/00 180/168 |
| 2015/0008058 A1 * | 1/2015 | Sato | ....................... | A63C 17/011 180/181 |
| 2015/0096820 A1 * | 4/2015 | Strack | .................. | B62K 11/007 180/181 |
| 2016/0001167 A1 * | 1/2016 | Anderson | ............ | A63C 17/012 180/181 |
| 2016/0045814 A1 * | 2/2016 | Zhou | ..................... | A63C 17/12 280/221 |
| 2016/0067588 A1 * | 3/2016 | Tan | ........................ | A63C 17/12 180/181 |
| 2016/0256746 A1 * | 9/2016 | Kramer | ............ | A63B 21/00058 |
| 2016/0332062 A1 * | 11/2016 | Wu | ........................ | A63C 17/12 |
| 2016/0368541 A9 * | 12/2016 | Strack | .................. | B62K 11/007 |
| 2017/0087442 A1 * | 3/2017 | Yang | .................... | A63C 17/011 |
| 2017/0101129 A1 * | 4/2017 | Ying | .................... | B62D 11/003 |
| 2017/0203194 A1 * | 7/2017 | Anderson | ............ | A63C 17/015 |
| 2017/0209745 A1 * | 7/2017 | Kramer | ............ | A63B 21/00058 |
| 2017/0217489 A1 * | 8/2017 | Ying | .................... | B62D 11/003 |
| 2017/0259163 A1 * | 9/2017 | Zhou | ................... | A63C 17/0033 |
| 2017/0274271 A1 * | 9/2017 | Sugata | ................. | A63C 17/011 |
| 2017/0341690 A1 * | 11/2017 | Pikulski | ................ | B62D 51/004 |
| 2018/0133553 A1 * | 5/2018 | Kramer | ................ | A63B 26/003 |
| 2018/0236347 A1 * | 8/2018 | Anderson | ............ | A63C 17/015 |
| 2018/0353840 A1 * | 12/2018 | Choi | ........................ | B60K 7/00 |
| 2018/0369683 A1 * | 12/2018 | Wen | ....................... | A63C 17/011 |
| 2018/0370582 A1 * | 12/2018 | Sato | ....................... | B62D 51/02 |
| 2019/0009163 A1 * | 1/2019 | Westfall | ................. | B60L 53/14 |
| 2019/0015732 A1 * | 1/2019 | Rosemeyer | .......... | A63C 17/265 |
| 2019/0016407 A1 * | 1/2019 | Rosemeyer | .......... | B62K 11/007 |
| 2019/0092387 A1 * | 3/2019 | Ying | .................... | B62K 11/007 |
| 2019/0151717 A1 * | 5/2019 | Kramer | ................ | A63B 26/003 |
| 2019/0199110 A1 * | 6/2019 | Vas | ....................... | H02J 7/0027 |

FOREIGN PATENT DOCUMENTS

| | | |
|---|---|---|
| CN | 201921446 U | 8/2011 |
| CN | 102358369 A | 2/2012 |
| CN | 105216887 A | 1/2016 |
| CN | 105346607 A | 2/2016 |
| GB | 2454934 B | 10/2011 |

OTHER PUBLICATIONS

Julia Layton, "How Robotic Vacuums Work", retrieved on Sep. 27, 2016 from Internet URL: http://electronics.howstuffworks.com/gadgets/home/robotic-vacuum.htm (15 pages).

Radio Flyer, "Spin 'N Saucer Datasheet", 2014, retrieved on Sep. 26, 2016 from Internet URL: http://web.archive.org/web/20140913134120/http://www.radioflyer.com/spin-n-saucer.html (2 pages).

2016 Esway Smart Mini Cheap Hoverboard, Four Wheels WalkCar Electric Self Balancing Scooter, retrieved on Mar. 23, 2016 from

(56) References Cited

OTHER PUBLICATIONS

Internet URL: http://esrover.en.alibaba.com/product/60416807940802718767/2016_esway_smart_mini_cheap_hoverboard_four_wheels_WalkCar_electric_self balancing_scooter (7 pages).
Shenzhen Easy Step Robot Co., Ltd., "Intelligent 4 Wheel Flat Car", retrieved on Mar. 23, 3016 from Internet URL: http://www.yita9.com/product/sampleproduct.html/intelligent4wheelflatcar (5 pages).
Self Balancing Electric Unicycles, "WalkCar 4 Wheels Laptop-Sized Self Balancing Scooter Video Reel from Japan", retrieved from Internet URL: http://selfbalancingelectricunicycles.com/walkcar-4-wheels-laptop-sized-self-balancing-scootervideo-reel-from-japan/) (12 pages).

\* cited by examiner

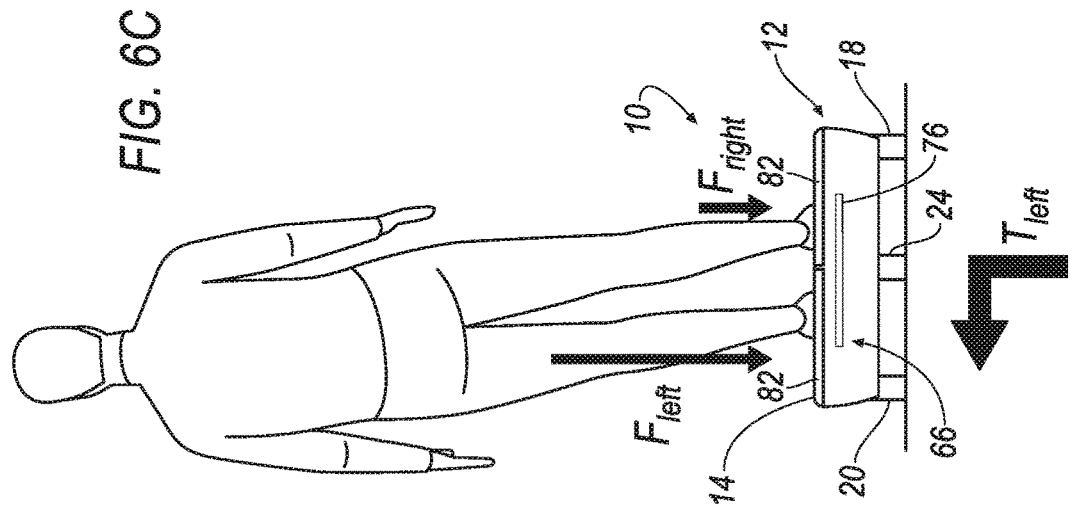
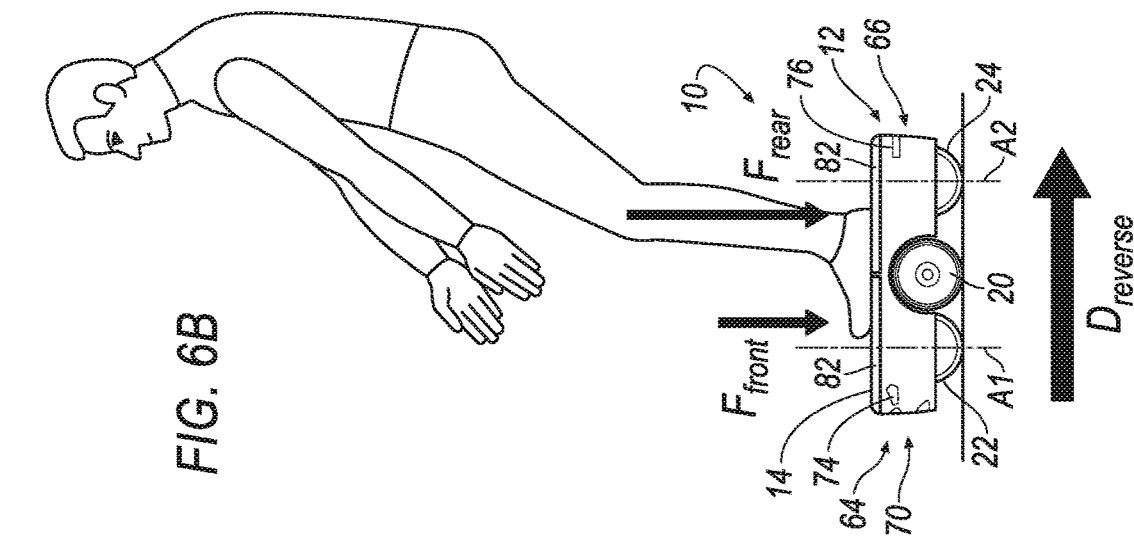
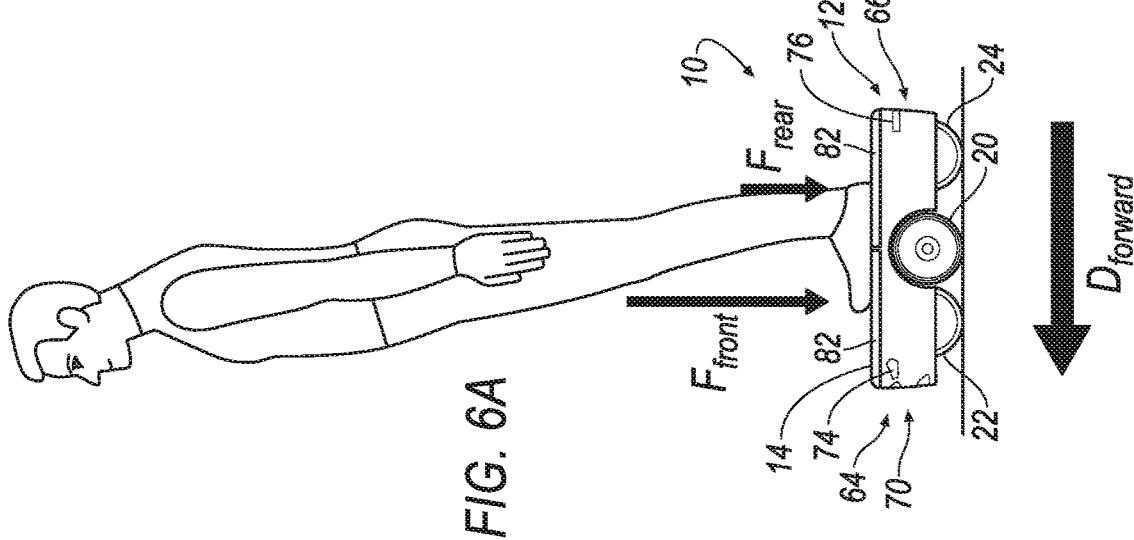

CONFIGURABLE TRANSPORTATION STRUCTURE

CROSS-REFERENCE TO RELATED APPLICATIONS

This patent application is a continuation-in-part of, and as such claims priority to, and all advantages of, PCT Application No. PCT/US2016/042407, filed on Jul. 15, 2016, which in turn claims priority to U.S. Provisional Application No. 62311593, filed on Mar. 22, 2016. This application is also a continuation-in-part, and as such claims priority to, and all advantages of, PCT Application PCT/US2016/045098, filed on Aug. 2, 2016. Each of the forgoing applications, to which this application claims priority as set forth above, are hereby incorporated herein by reference in their respective entireties.

BACKGROUND

With growing population and a shift toward more urbanization, urban population is increasing. Users increasingly ride public transportation systems and walk from public transport stations to final destinations. Moreover, many suburban residents now park their cars in parking structures in city centers and walk to their final destination to avoid traffic congestion of city centers. An improved transportation device and improved infrastructure for such improved transportation devices could support those trends.

BRIEF DESCRIPTION OF THE DRAWINGS

FIG. 6A is a side view of the device of FIG. 1 moving forward and transporting a user.

FIG. 6B is a side view of the device of FIG. 1 moving backward and transporting a user.

FIG. 6C is a rear view of the device of FIG. 1 turning left and transporting a user.

DETAILED DESCRIPTION

Introduction

Figure 1:
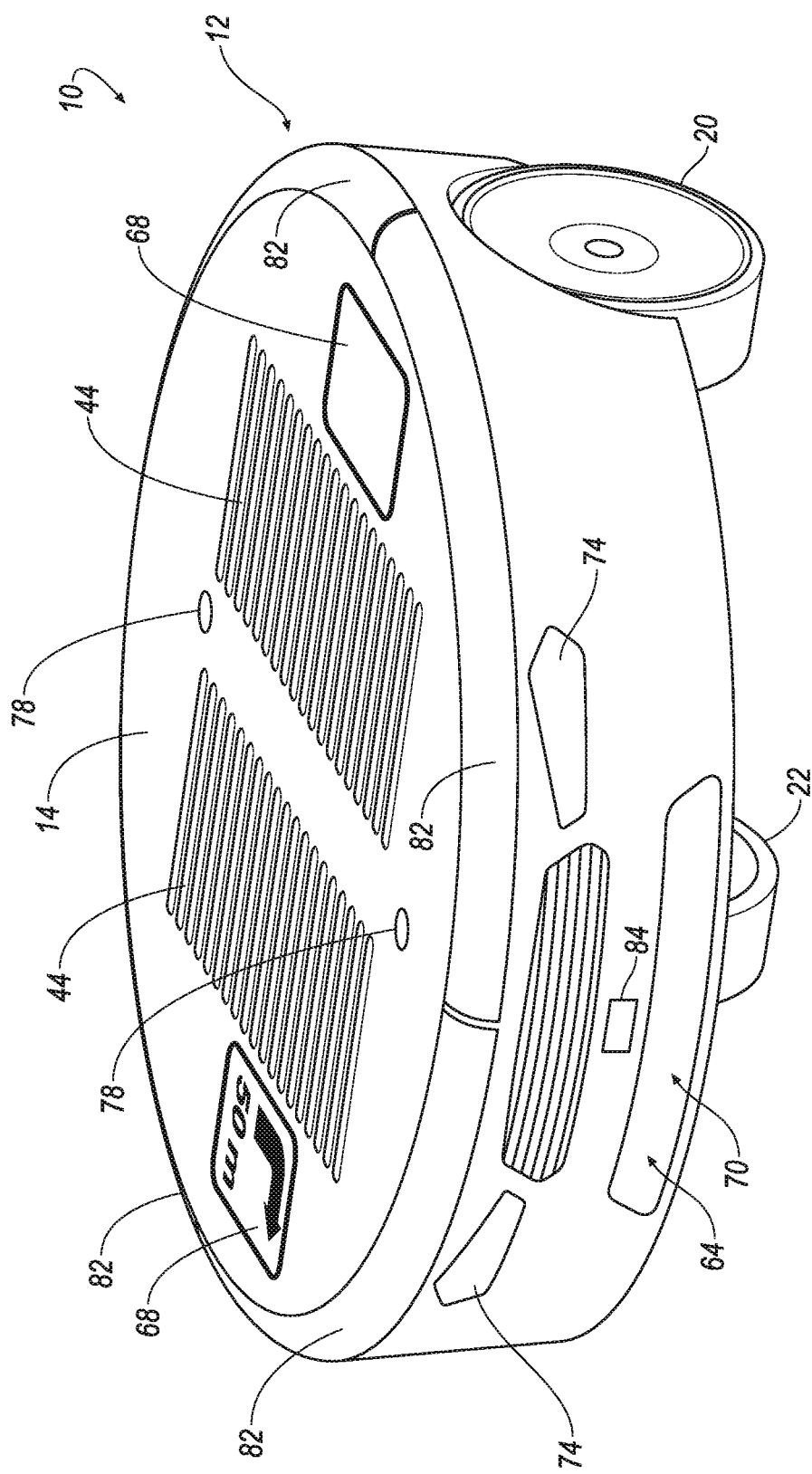
FIG. 1 is a perspective view of an example transportation device.

Disclosed herein is a system including a support structure that includes a bottom surface and a connector plate pivotably connected to the bottom surface, and a device including a wheel, the device being releaseably connectable to the connector plate.

The support structure further may include two or more circular recesses, each recess having (i) a first open end at the bottom surface of the support structure and (ii) a second end pivotably connected to the connector plate.

The connector plate may be pivotable about a longitudinal axis of the recess; the longitudinal axis being perpendicular to the bottom surface of the support structure.

A top surface of the device may touch the connector plate.

The support structure may further include a battery that is electrically connectable to the device.

The support structure may further include a wireless charger circuit that is electrically connected to the battery.

The support structure may further include a motor that is drivably connectable to the device.

The support structure may further include a processor that is programmed to actuate the device based on received support structure route data.

The processor of the support structure may be further programmed to generate an actuation command for a device based on (i) a location of the device relative to a reference point of the support structure and (ii) a planned path of the support structure.

The support structure may further include a human machine interface and a processor programmed to actuate the human machine interface based on at least one of route data, planned path of the support structure, support structure reservation status.

The human machine interface may include a light, and the processor may be further programmed to actuate the light to indicate a location of a holding member of the support structure.

The support structure may further include a second connector plate pivotably connected to the bottom surface, and a second device including a second wheel, the second device being releaseably connectable to the second connector plate.

Exemplary System Elements

With reference to the Figures, wherein like numerals indicate like parts throughout the several views, with reference to FIGS. 1-11, an example device 10 includes a platform member 12 with a top 14 and a bottom 16, a plurality of wheels 18, 20, 22, 24 each of the wheels rotatably mounted to the bottom 16 of the platform member 12, and a motor 26, 28 mounted to the bottom 16 of the platform member 12, and a drive shaft 30, 32 extending from the motor and drivably coupled to at least one of the wheels 18, 20, 22, 24.

The device 10 may be used by a user as a mobility device. The device 10 may carry the user while the user stands on the top 14 of the device 10. The device 10 accordingly may provide a convenience for the user, for example, when the user needs to travel a long distance in a crowded urban area that the user would otherwise walk. Additionally, the device 10 may be useful to carry a load 34, e.g. a shopping bag or other cargo. The device 10 could carry the load 34 and follow the user as the user walks.

Figure 2:
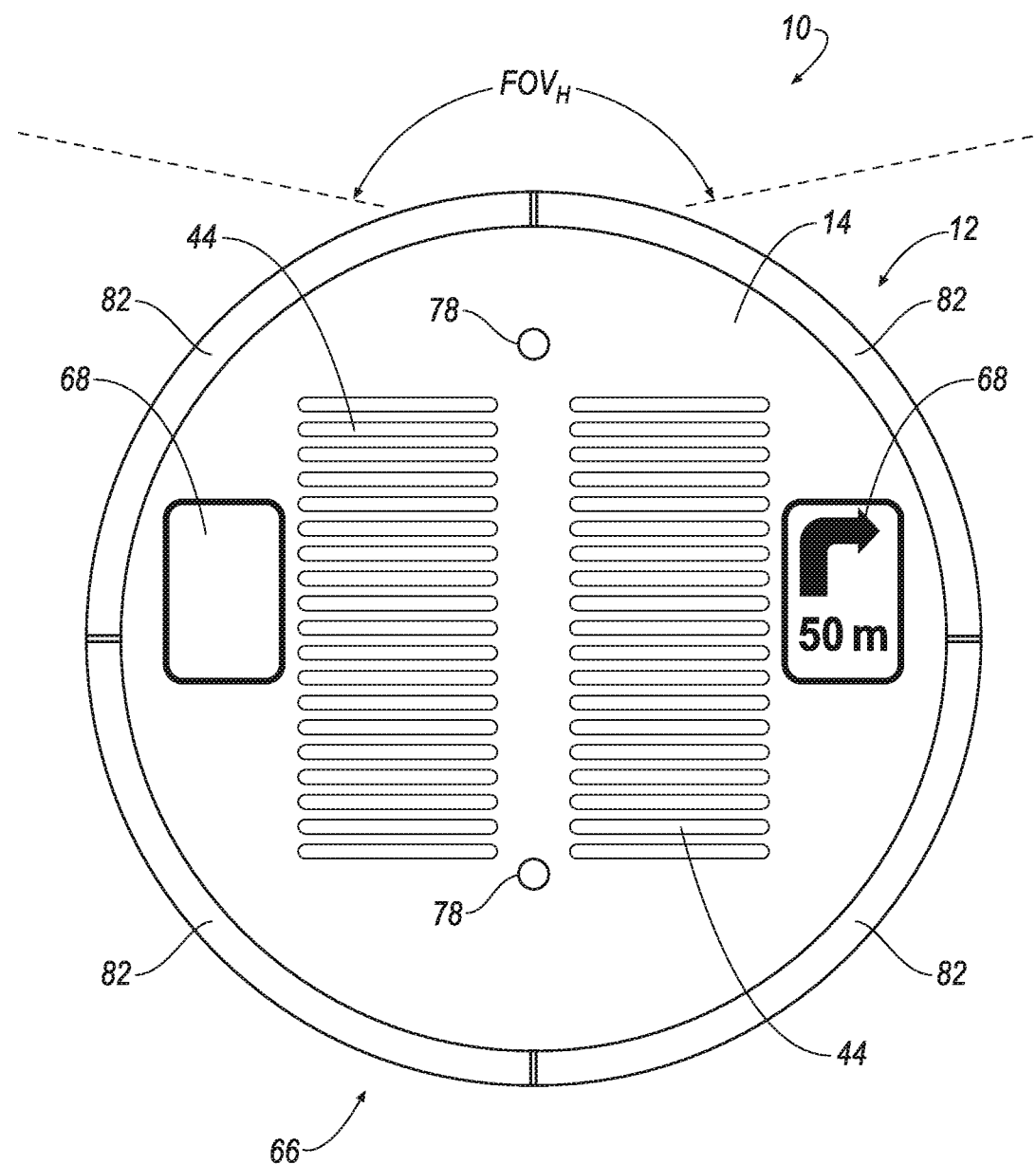
FIG. 2 is perspective top view of the device of FIG. 1.

A right wheel 18, a left wheel 20, and a front wheel 22 rotatably mounted to the bottom 16 of the device 10 are shown in FIGS. 1 and 2. The device 10 may move on the ground surface while the wheels 18, 20, 22, 24 rotate. A force to move the device 10 may be provided by the motor drivably coupled to one or more of the wheels. The device 10 typically is able to move in different directions, e.g., forward and backward.

Figure 4:
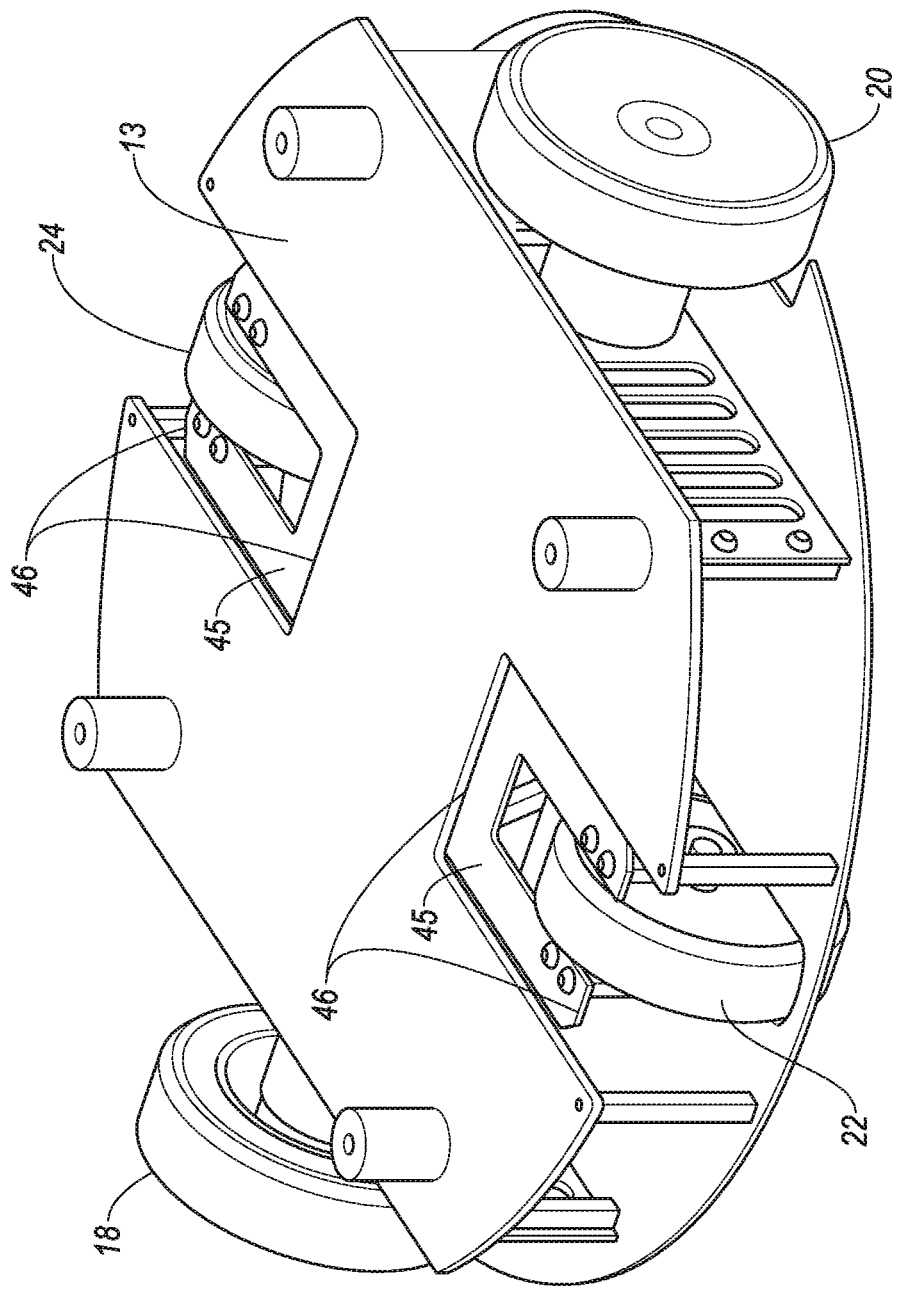
FIG. 4 is a perspective view of an example transportation device with a suspension component.

The front wheel 22 may be pivotable about an axis A1 transverse to the platform member 12, as shown in FIG. 6B, or the front wheel 22 may be an omnidirectional, i.e., "Omni" wheel able to slide laterally, as shown in FIG. 4. Omni wheels, as are known, can advantageously provide lateral sliding movements when, e.g., the device 10 turns or negotiates a curve. Omni wheels are for example built as wheels with small discs mounted around the wheel circumference while rotational axes of these small discs are transverse to the rotational axis of the Omni wheel. Omni wheels can, therefore, provide movements in a forward or in a backward direction, but can also slide laterally with ease, i.e., through rotation of the small discs. Alternatively, Omni wheels can be built in any other suitable way to provide sliding movements in lateral direction. Additionally or alternatively, one or more of the wheels 18, 20, 22, 24 may be pivotable wheels, Omni wheels, or pivotable Omni wheels.

Figure 3:
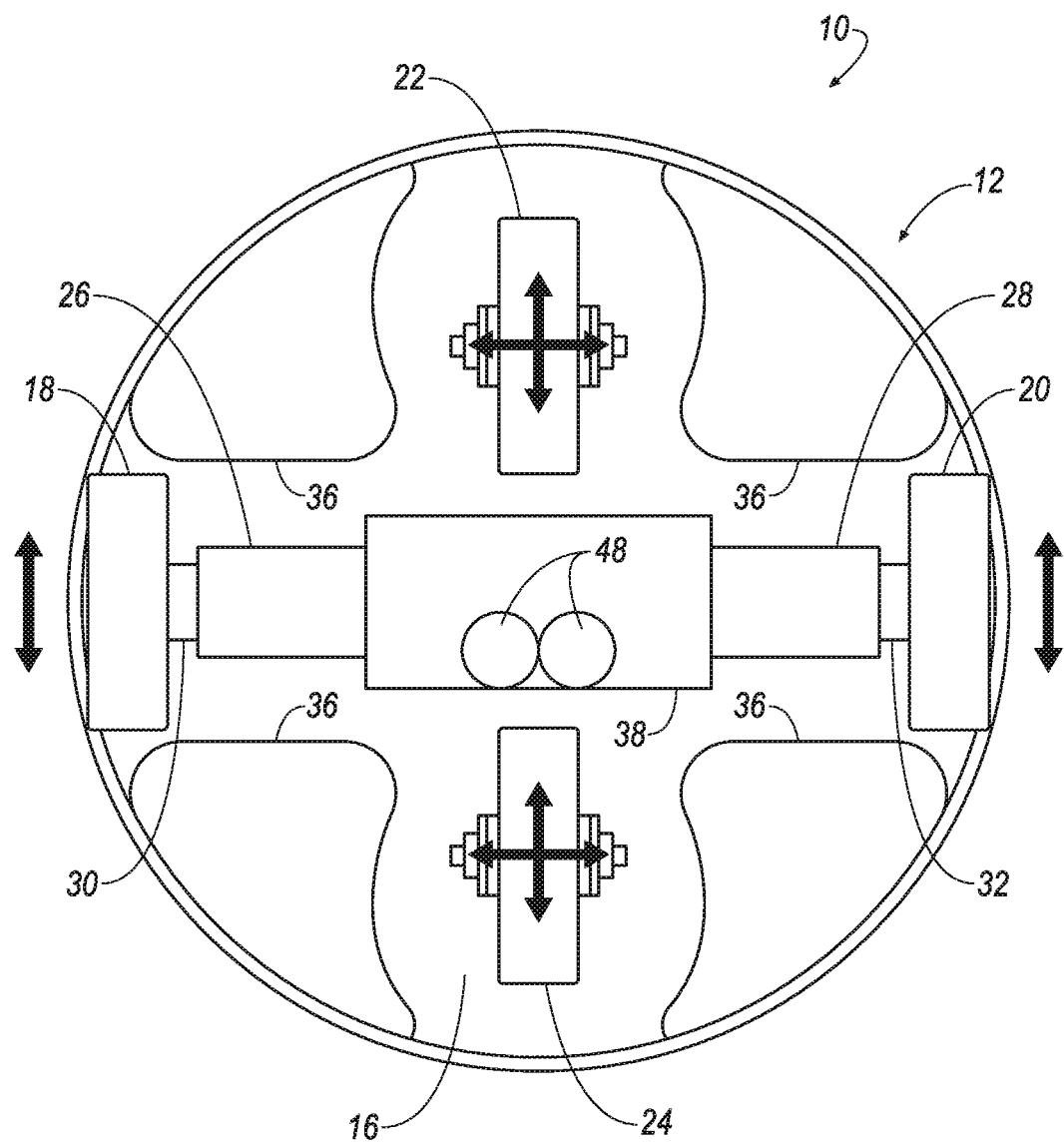
FIG. 3 is perspective bottom view of the device of FIG. 1.

As another example shown in FIGS. 3 and 6B, the device 10 has a rear wheel 24 rotatably mounted to the bottom 16 of the platform member 12. Additionally, the rear wheel 24 may be a wheel pivotable about an axis A2, an Omni wheel, or an Omni wheel pivotable about the axis A2.

As shown in the Figures, the platform member 12 has a substantially circular shape. Alternatively, the platform member 12 may have any other suitable shape. The platform member 12 may include a chassis 13, as shown in FIG. 4. The chassis 13 may include beams, sheets, etc. that are fixed together, e.g., welded. The chassis 13 may be formed of metal, hard plastic, or any other suitable material. The top 14 can be attached to the chassis 13, e.g., with screws.

Figure 5A:
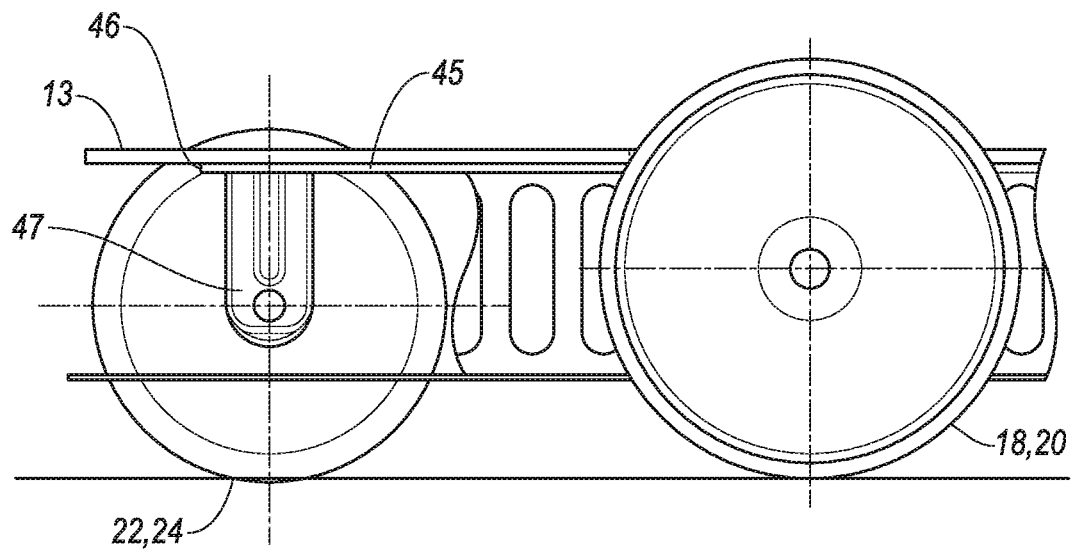
FIG. 5A is a side view of the device of FIG. 4.
Figure 5B:
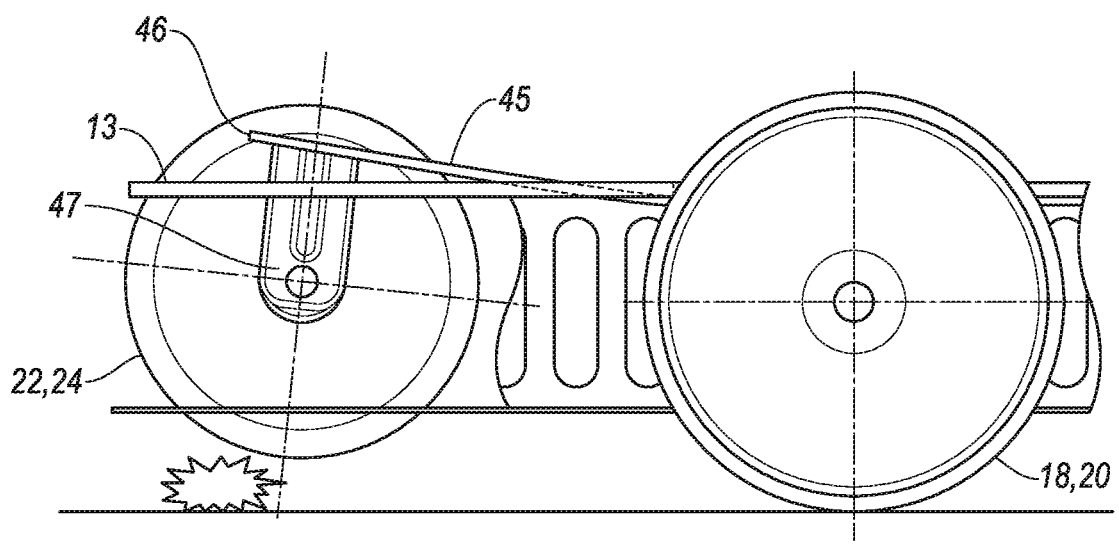
FIG. 5B is a side view of the device of FIG. 4 moving over a small object.

The device 10 may include one or more suspension component(s) 45 mounted to the platform member 12, e.g., chassis 13, as shown in FIGS. 4 and 5, to, e.g., smooth a ride over rough surfaces or objects. The suspension components 45 may have a first end 46 mounted to the chassis 13 and a second end 46 mounted to a wheel 18, 20, 22, 24, e.g., via a wheel attachment member 47. When, e.g., the ground surface is flat, the suspension component 45 may be in a steady state, as shown in FIG. 5A, i.e., the wheel 22, 24 is not moved relative to the chassis 13. Whereas, when, e.g., the device rides over an object or a rough surface, the suspension component 45 can allow a movement of the suspension component 45 second end 46 relative to the first end 46 along an axis transverse to the chassis 13, as shown in FIG. 5B. The suspension component 45 may be a leaf spring, e.g., formed of a flexible steel, which can bend as shown in FIG. 5B.

The motor 26, 28 may be an electric motor. Electrical energy required to operate the electric motor may come from a plurality of batteries 36 mounted to the platform member 12, as shown in FIG. 3. As an example, in order to optimally use the space, four batteries 36 can be mounted at the bottom 16 of the device 10. Additionally, the device 10 may include a second electric motor 28 and a second shaft 32 extending therefrom, the second electric motor 28 mounted to the bottom 16 of the platform member 12 wherein the drive shaft 30 driveably coupled to the right wheel 18, and the second shaft 32 is driveably coupled to the left wheel 20.

As shown in FIG. 3, the device 10 may have an electronic controller 38 mounted to the bottom 16 of the platform member 12 or elsewhere having a processor 40 and a memory, the memory storing instructions executable by the processor 40 to control a steering, speed, acceleration, and/or deceleration of the device 10. Moreover, the device 10 may have one or more batteries 36 mounted to the bottom 16 of the platform member 12 providing electrical energy for the electric motors 26, 28.

Figure 11:
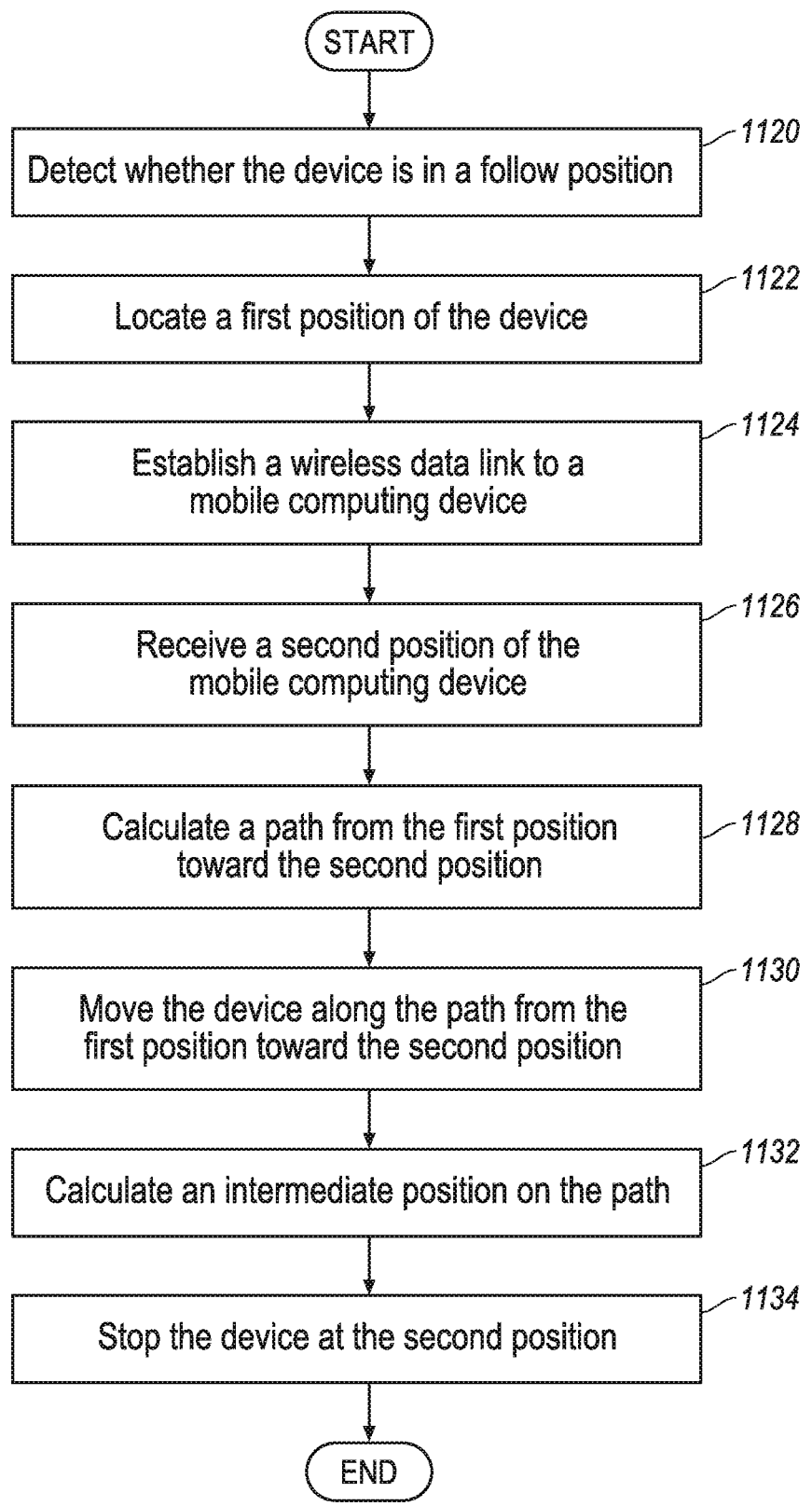
FIG. 11 is a flowchart of a method for a follow mode for the device of FIG. 1.

The electronic controller 38 may include a motor drive circuitry 42 as shown in FIG. 11 to control the speed of the electrical motors 26, 28, e.g., a pulse width modulation circuitry. The motor drive circuitry 42 may actuate the motors 26, 28 to accelerate, decelerate, or steer the device 10.

Figure 10:
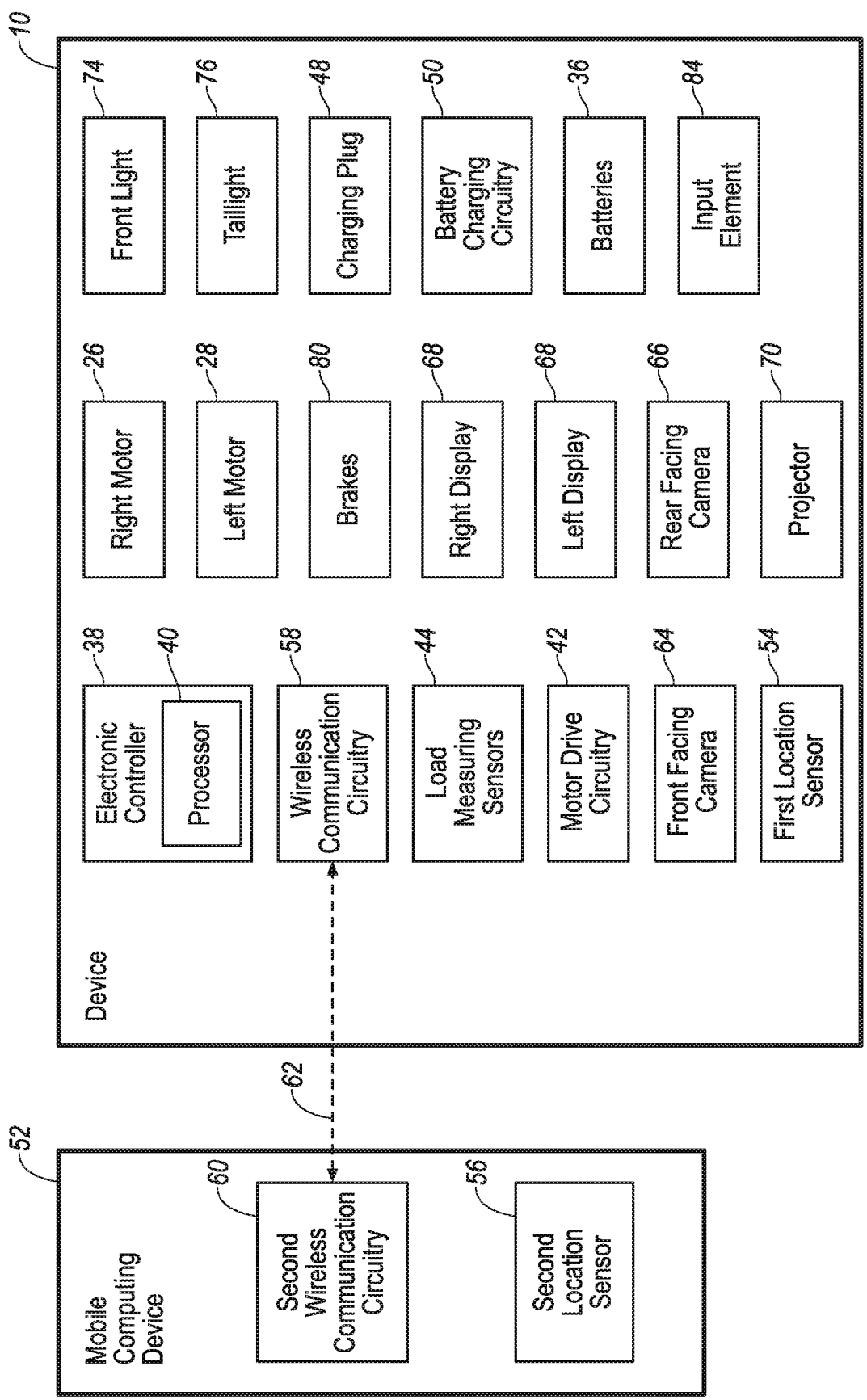
FIG. 10 is a block diagram showing electrical components of the device and a mobile computing device.

The device 10 may include an input element 84, e.g., a push button or a toggle switch, mounted to, e.g., the platform member 12, to select a mode of operation for the device 10, as shown in FIGS. 1 and 10. The modes of operation can, for example, include a normal mode and an economy mode. The operation of the device 10 in the economy mode may reduce an energy consumption of the electric motors 26, 28 compared to the normal mode. For example, to reduce the energy consumption, in the economy mode a maximum speed of the device 10 may be less than a maximum speed of the device 10 in the normal mode. As an example, the processor 40 may be programmed to receive a signal from the input element 84 and select a mode of operation according to the received signal, e.g., by adjusting a maximum speed threshold according to the selected mode of operation. The processor 40 can be further programmed to actuate the motor to drive with a speed that does not exceed a maximum speed determined according to the mode of operation. Alternatively or additionally, the processor 40 may receive a signal from the mobile computing device 52 or any other device and select the mode of operation according to the received signal. Additionally, the device 10 may include any other modes of operations selectable through the input element 84. Alternatively, the input element 84 can be mounted to any other suitable part of the device 10.

As shown in Figures, the device 10 may include one or more load measuring sensors 44 mounted to, e.g., the top 14, of the platform member 12. The load measuring sensors 44 may be load cells, e.g. strain gauge load cells. A user may stand on the top 14 of the platform member 12 during a ride, i.e. applying weight on the load measuring sensors 44. The load measuring sensors 44 may be used to enable the user to request acceleration, deceleration, steer right, steer left while riding on the ground surface. As an example, controlling the device 10 using load measuring sensors 44 can be done based on a load distribution on the top 14 of the platform member 12. For example, the load measuring sensors 44 may include a front right zone, a front left zone, a rear right zone, and a rear left zone. Alternatively, the load measuring sensors 44 may be an array of load cells, as shown in FIGS. 1 and 2, wherein the load distribution can be calculated based on the force data measured at each of load cell elements in the array of load cells compared to a location of the load cell element compared to a reference point on the top 14 of platform member 12.

Referring to FIGS. 6A-6C, a user may lean forward or backward in order to accelerate or decelerate, and may lean left or right in order to steer to a left or a right direction. The processor 40 may be programmed to receive data from the load measuring sensors 44 indicating a force detected at one or more of the zones, and actuate the motor 26, 28 to move to a direction based on the received force data. For example, when the device 10 with the load measuring sensors 44 with different zones, measures a greater force $F_{front}$ in the front zones than the force $F_{rear}$ in the rear zones, it may indicate a request for accelerate in a direction $D_{forward}$ as shown in FIG. 6a, or the greater force $F_{left}$ on the left zones than the force $F_{right}$ in the right zones of the load measuring sensors 44 may indicate the request to steer to the left direction of $T_{left}$ as shown in FIG. 6c. Alternatively, the user may ride the device 10 as a skate (not shown), i.e., user may stand toward a right or a left direction on the top 14 of the device. In other words, the user may face to a direction extending between the right wheel 18 and the left wheel 20. In this example, the device 10 may be accelerated, decelerated, or steered in a similar way, as described with respect to FIGS. 6A-6C.

Referring to the example shown in FIG. 3, the device 10 may steer using the driveably connected wheels 18, 20, for example, the right wheel 18 and the left wheel 20 are driveably connected to the electric motor 26 and the second electric motor 28 respectively. The processor 40 may be programmed to actuate the motor drive circuitry 42 to apply different speed and/or different direction of rotation in the electric motors 26 versus the second electric motor 28 in order to steer the device 10. As another example, when the right wheel 18 and the left wheel 20 are both driveably connected to the electric motor 26, the device 10 may include a right clutch adjusting a torque transferred from the electric motor to the right wheel 18 and a left clutch adjusting the torque transferred from the electric motor to the left wheel 20. The processor 40 may be programmed to actuate the right clutch and the left clutch to transfer different amounts of torque to the right wheel 18 versus the left wheel 20, which may cause the device 10 to change the direction of the movement. Additionally or alternatively, swiveling of wheels 22, 24 about the axis A1 or A2 transverse to the platform member 12 controlled by the processor 40 may cause the device 10 to steer.

As an example, in a device 10 with Omni wheels 22, 24, a turn in a right or left direction may cause the Omni wheels slide laterally. This may advantageously provide a smoother turn for the device 10. Alternatively or additionally, the front wheel 22 and/or the rear wheel 24 may pivot about axes A1, A2 transverse to the platform member 12.

Figure 9:
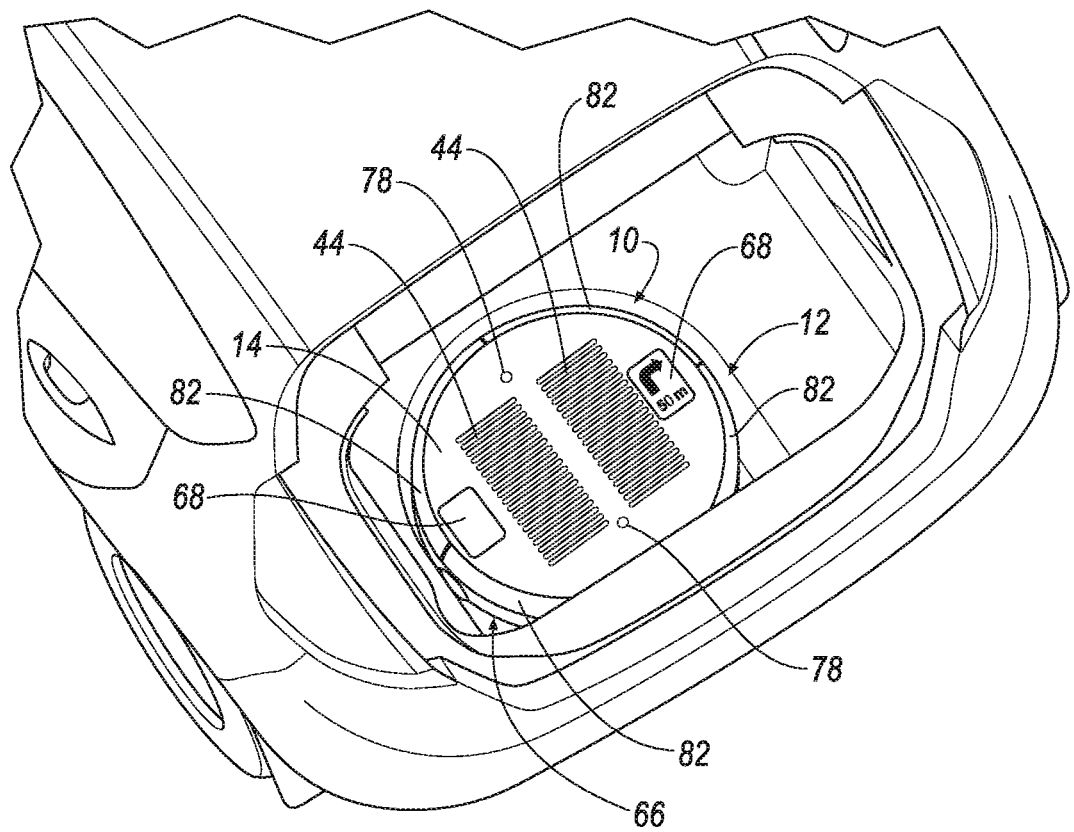
FIG. 9 is a perspective view of the device of FIG. 1 stored in a trunk of a vehicle.

An electrical harness including a plurality of wires may interconnect the batteries 36, the electric motors 26, 28, the electronic controller 38, and the load measuring sensors 44. Additionally, the device 10 may include a charging plug 48 electrically connected to the electrical harness. The charging plug 48 can allow charging the batteries 36 of the device 10. The batteries 36 of the device 10 may be rechargeable and the electronic controller 38 may include a battery charging circuitry 50 to control the flow of electrical energy required for charging the battery 36. Alternatively, the batteries 36 may be charged wirelessly by using a charging coupler instead of the wired charging plug 48, configuring the battery charging circuitry 50 to support inductive charging, and having an inductive charge port connected to a power source, e.g. a vehicle battery. Charging the batteries 36 wirelessly may provide a convenience for the user. The processor 40 of the electronic controller 38 may be programmed to control a charging of the battery 36 when the device 10 is connected through the charging plug 48 to a power source, for example while stored in a spare tire place holder in a trunk of a vehicle as shown in FIG. 9. Alternatively or additionally, the device 10 may be charged in dedicated charging stations around urban areas, at a home, or any other suitable place. Additionally, the device may include a display mounted to the platform member 12, to display a charging level of the batteries 36, for example a segmented ring shape display 82 with four segments may be mounted to the perimeter of the platform member 12. Each of the four segments may be turned on and off to illustrate the charging level of the batteries 36 in five distinct levels of 0%, 25%, 50%, 75%, and 100% charged by illuminating zero, one, two, three or all segments respectively.

In order to avoid a collision of the device 10 with an object on the road having a possibility of rapid deceleration is advantageous. The electronic controller 38 may be programmed to operate the electric motors in a generator mode when the user requests a rapid deceleration, for example when the weight of the user is primarily applied on the rear zones of the load measuring sensors 44. The electric motors in the generator mode resist against the rotation of rotors of the electric motors and thereby may decelerate the device 10. This has the additional benefit that batteries 36 may be charged during a deceleration, if the battery charging circuitry 50 and the electronic controller program support a flow of energy back to the batteries 36, a so-called recuperation mode of operation known from hybrid vehicles. Additionally or alternatively, the device 10 may include one or more brakes 80. For example, the brakes 80 may be actuated by the processor 40 when the request of the user to decelerate exceeds a certain deceleration threshold.

Figure 7:
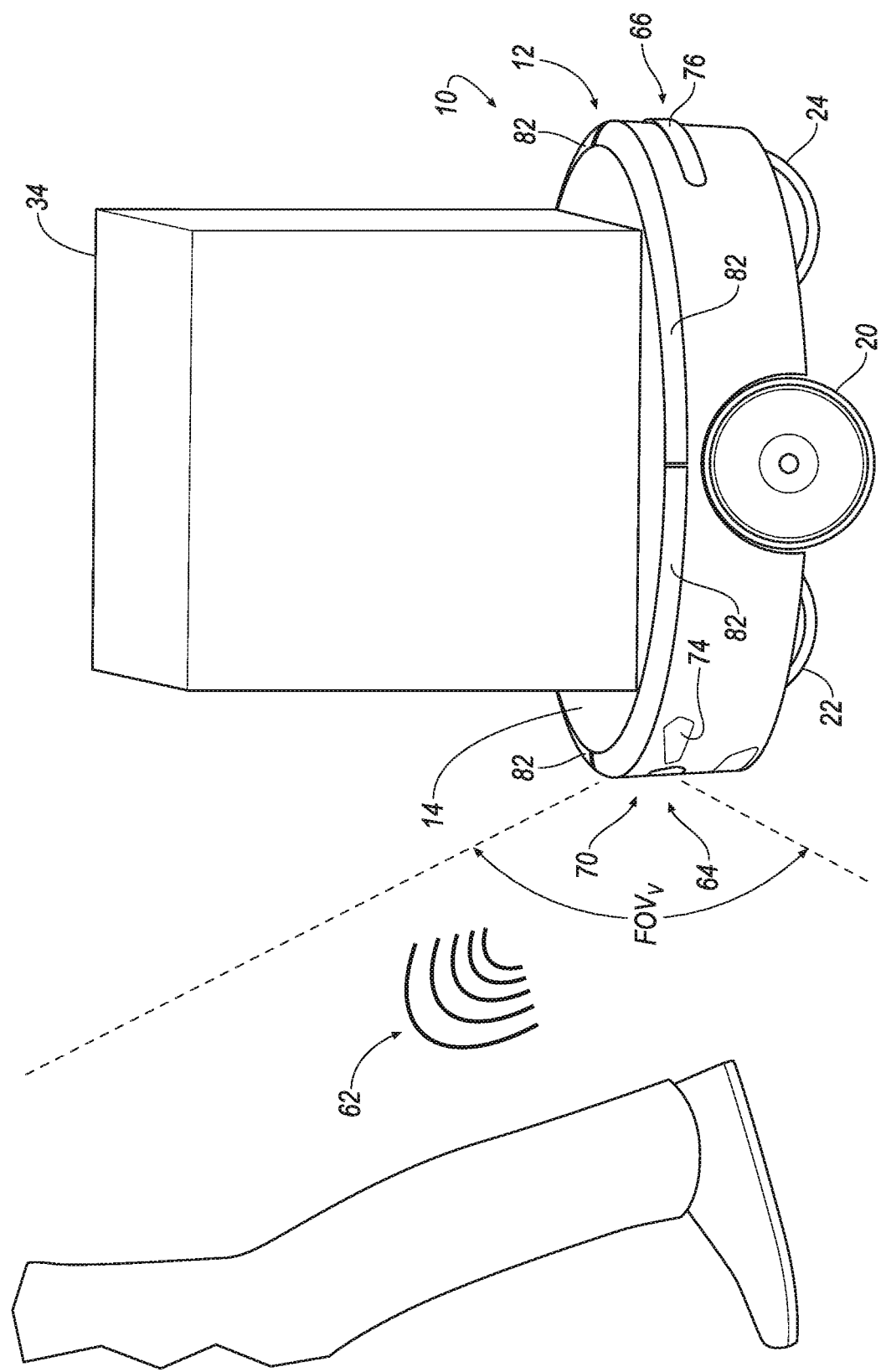
FIG. 7 is a perspective view of the device of FIG. 1 carrying a load and following a user.

As another example of using the device 10 in a "follow" mode as shown in FIG. 7, the user may put a load 34, e.g. a shopping bag on the platform member 12, and the device 10 may move on the ground surface next to, in front of, or behind the user, without the user riding the device 10. As shown in FIG. 10, a device 10 may have a first location sensor 54, e.g. a global positioning sensor or a location sensor determining a coordinate of the device 10 and a wireless communication circuitry 58, and a mobile computing device 52 may be carried by the user with a second location sensor 56, e.g., a global positioning sensor determining a global coordinate of the mobile computing device 52, with a second wireless communication circuitry 60, e.g., Bluetooth, and the processor 40 programmed to execute a following process as shown in FIG. 11. In short, the mobile computing device 52 of the user device 10 can communicate with the device electronic controller 38 to actuate the device 10 motors 26, 28 to cause the device 10 to move next to, behind, or in front of, the user.

Referring to FIG. 11, the following process includes steps to detect whether the device 10 is in the follow mode, receive a first position (e.g., geo-location using latitude and longitude coordinates as in known) of the device 10, establish a wireless data link 62 to the mobile computing device 52, receive a second position of the mobile computing device 52, calculate a path from the first position to the second position, and move the device 10 along the path from the first position to the second position. To control the movement of the device 10 along the path, the electronic controller 38 may implement various control methods, e.g., proportional integral derivative control, cascade control, fuzzy control, or any other suitable control method. In order to move the device 10 along the path, the electronic controller 38 may need to actuate the device 10 to steer as described above to cause the device 10 to follow a user's walking path.

The user may prefer that the device 10 in the follow mode moves in front of or next to the user. In this case the processor 40 may be programmed to receive navigation information from the mobile computing device 52 and receive commands from the mobile computing device 52 to accelerate, decelerate and steer toward a predetermined destination. Additionally or alternatively, the device may move on a navigation path in an autonomous mode, without the necessity of the user being on the device 10 or in a proximity of the device 10. In this case the acceleration, deceleration and steering of the device 10 is controlled by the processor 40 and/or by the mobile computing device 52 or a cloud server. This may be useful to create a fleet of devices 10 moving on predetermined routes in urban areas creating a so-called hop on hop off transportation mechanism for users. Additionally, a user may use the mobile computing device 52 to send the device 10 autonomously to a certain destination.

The device 10 in the follow mode moving behind the user may additionally or alternatively include a sensor 64, 66, e.g., a camera, for detecting, e.g., objects, in proximity of the device 10, mounted to the perimeter of the device 10 connected through the electrical harness with the electronic controller 38. The sensor 64, 66 has a horizontal field of view $FOV_H$ and a vertical field of view $FOV_V$ covering at least a portion of a surrounding of the device 10. Alternatively or additionally, the sensor 64, 66 may include a radar, LIDAR, or ultrasound sensors for detecting the objects in proximity of the device 10. Either a second processor in the sensor 64, 66 or the processor 40 in the electronic controller 38 may be programmed to detect the user and calculate the position, e.g., geo-coordinates, of the device 10 relative to the user. The detection of the user may be done using a specific graphical pattern like a QR code on a clothing or accessories of the user or any other feature which enables a camera sensor 64, 66 to distinguish the user from other people around the device 10.

A method for the follow mode as shown in FIG. 11 includes detecting whether the device 10 is in a follow position as shown in block 1120, locating the first position of the device 10 as shown in block 1122, establishing the wireless data link 62 to the mobile computing device 52 as shown in block 1124, receiving the second position of the mobile computing device 52 as shown in block 1126, calculating the path from the first position toward the second position as shown in block 1128, and moving the device 10 along the path from the first position toward the second position as shown in block 1130.

The processor 40 of the electronic controller 38 may be programmed to detect an object in the field of view of the sensor 64, 66, actuate the electric motors 26, 28 to move the device 10 in the direction toward the object or away from the object. The object detected by the device 10 may be a pattern in the field of view of the sensor 64, 66.

As another example, to avoid a collision between the device 10 and the user, while following the user, the processor 40 may send a request to stop when the device 10 reaches a predetermined minimum proximity, i.e., distance, threshold. The device 10 may move again after the user walks forward and the distance between the device 10 and the user exceeds the predetermined minimum distance. As shown in FIG. 11, the method may include calculating an intermediate position on the path as shown in block 1132, the intermediate position having a distance to the second position at least equal to the minimum proximity threshold, and stopping the device 10 at the second position as shown in block 1134.

Figure 8:
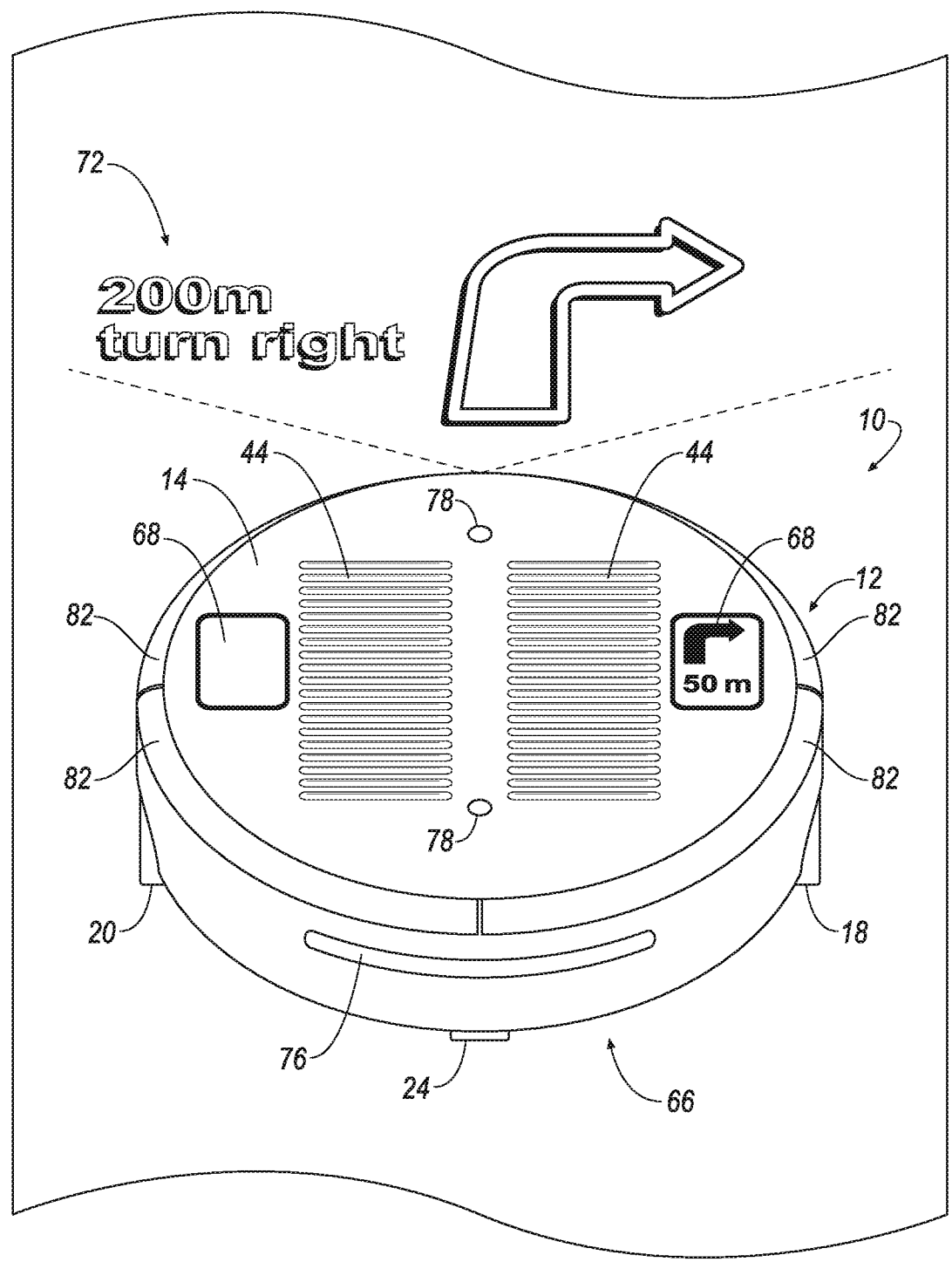
FIG. 8 is a perspective view of the device of FIG. 1 illustrating each of a mounted display and a projected display.

As shown in FIG. 8, the device 10 may include one or more display elements 68 mounted to the platform member 12. The display elements 68 may provide information to the user, e.g. when the device 10 moves in the autonomous mode and the user stands on the device 10, the displays may indicate a next change in the direction of movement to the user. Alternatively or additionally, the device 10 may include a projector 70 having a projection axis extending from the platform member 12 which projects information in visual form 72 on a surface, e.g. on the ground surface as shown in FIG. 6.

For better visibility, the device 10 may include a plurality of light elements mounted to the perimeter of the device 10, e.g. a front light 74 and/or a tail light 76.

As shown in FIG. 8, the device 10 may have a hole 78 on the top 14 of the platform member 12 to provide a possibility of supporting an umbrella or the like of the user. This may give an improved feeling of stability to the user. This can be used also for holding a stick used by the user as a walking assistance. Additionally or alternatively, a pole may be mounted to the top 14 or the chassis 13 of the platform member 12 which can be held by the user for better stability.

To carry multiple users and/or cargo, and/or to provide more comfort for user(s), a support structure can be provided that supports the users and/or cargo, and utilizes the transportation device 10 for navigation. With reference to FIGS. 12A-12B and 13-16, a support structure 100 includes a bottom surface 102 and a connector plate 104 pivotably connected to the bottom surface 102, and also a device 10 including a wheel 20, the device 10 being releaseably connectable to the connector plate 104.

The support structure 100 may have various shapes and/or components, as discussed below with reference to FIGS. 12A-12B and 13-15. The support structure 100 may be formed of plastic, metal, and/or composite material, e.g., carbon fiber, etc. The support structure 100 may be hollow inside and/or may have at least partially a solid core (i.e., filled inside).

The support structure 100 may have a top surface 120 spaced away from (e.g., parallel to) the bottom surface 102. The support structure 100 may include one or more holding members 126, e.g., support walls, handrail(s), and/or enclosure(s), etc., as further discussed with reference to FIGS. 13-15. In one example, the holding member(s) 126 may be physically supported by (i.e., attached to) the top surface 120 of the support structure 100 and may have a height $h_2$ from the structure 100 top surface 120.

In one example, the connector plate 104 may be a circular disk formed of metal, plastic, composite material, etc. The connector plate 104 may have a top surface 132 and a bottom surface 112. The connector plate 104 may be pivotably coupled to the support structure 100 bottom surface 102 (i.e., can rotate or pivot about an axis A3). In one example, the connector plate 104 may be releaseably connected to the support structure 100 bottom surface 102 via a mechanical connection such as a ball bearing 130 that is attached to the plate 104 top surface 132. The ball bearing 130 may be releaseably connectable to the bottom surface 102 via an attachment 134, e.g., a click and release connector, screw, bolt, etc. Alternatively, the ball bearing 130 may be permanently attached to the bottom surface 102 and may be releaseably connectable to the connector plate 104. In yet another example, the connector plate 104 may be pivotably attached via the ball bearing 130 to the support structure 100 bottom surface 102.

The support structure 100 may carry users and/or loads. The support structure 100 may be placed on one or more devices 10, which carry the support structure 100, i.e., navigating the support structure 100. A top surface 14 of each of the transportation devices 10 may touch a respective connector plate 104 bottom surface 112. Via a pivotable connection of the connecting plate(s) 104 to the support structure 100, the devices 10 may steer the support structure 100. In other words, based on a change of a direction of a device 10, the device 10 and the connector plate 104 (while being fixed relative to one another) rotate relative to the support structure 100, and therefore, a direction of a support structure 100 movement, e.g., a heading, may change.

In one example, each of the connecting plates 104 are pivotable relative to the support structure 100. In yet another example, at least one of the devices 10 is fixed relative to the support structure 100. For example, a device 10 top surface 14 may touch the support structure 100 bottom surface 102. Therefore, the device 10 touching the support structure 100 bottom surface 102 may not rotate relative to the support structure 100 but still may provide acceleration and/or deceleration of the support structure 100.

In one example, the support structure 100 may have one or more recesses 106 for placement of the device(s) 10. A recess 106 may have cylindrical shape with a longitudinal axis A3. The connector plate 104 may be pivotable about the longitudinal axis A3 of the recess 106. The longitudinal axis A3 may be perpendicular to the bottom surface 102 of the support structure 100. Each recess 106 may have a first open end 108 at the bottom surface 102 of the support structure 100 and a second end 110 pivotably connected to one of the connector plates 104.

A depth d of a recess 106 may be less than a height $h_1$ of a transportation device 10. Thus, while the support structure 100 is placed on the device 10, the bottom surface 102 may be above the ground, i.e., higher than the device 10 chassis 13. A diameter $r_1$ of the recess 106 may exceed a diameter $r_2$ of the device 10 (e.g., 1 centimeter larger). Thus, the device 10 may freely pivot about the axis A3 without having a friction with an interior surface of the recess 106.

Figure 12A:
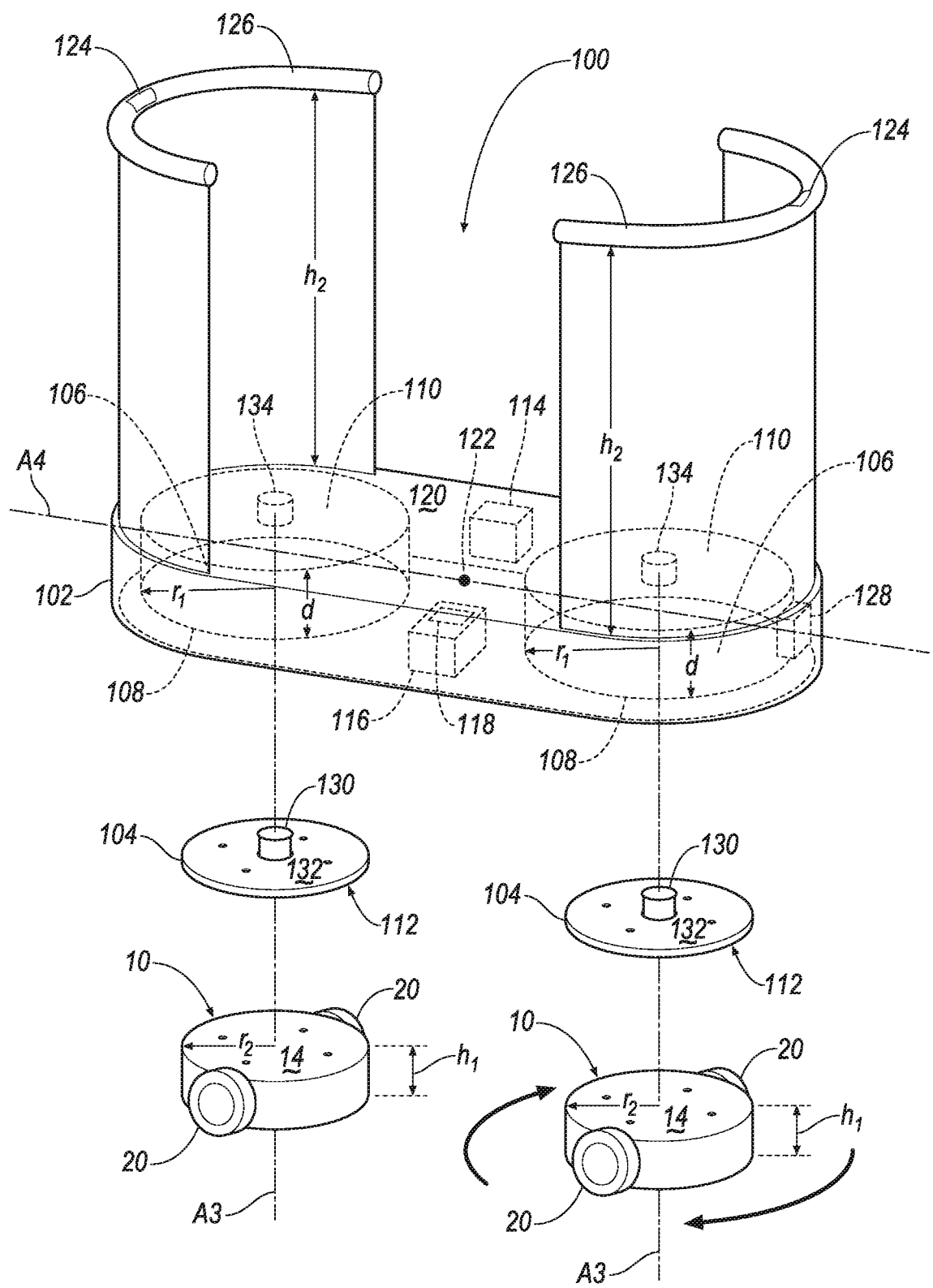
FIGS. 12A-12B are perspective views of an example support structure and two transportation devices of FIG. 1.
Figure 12B:
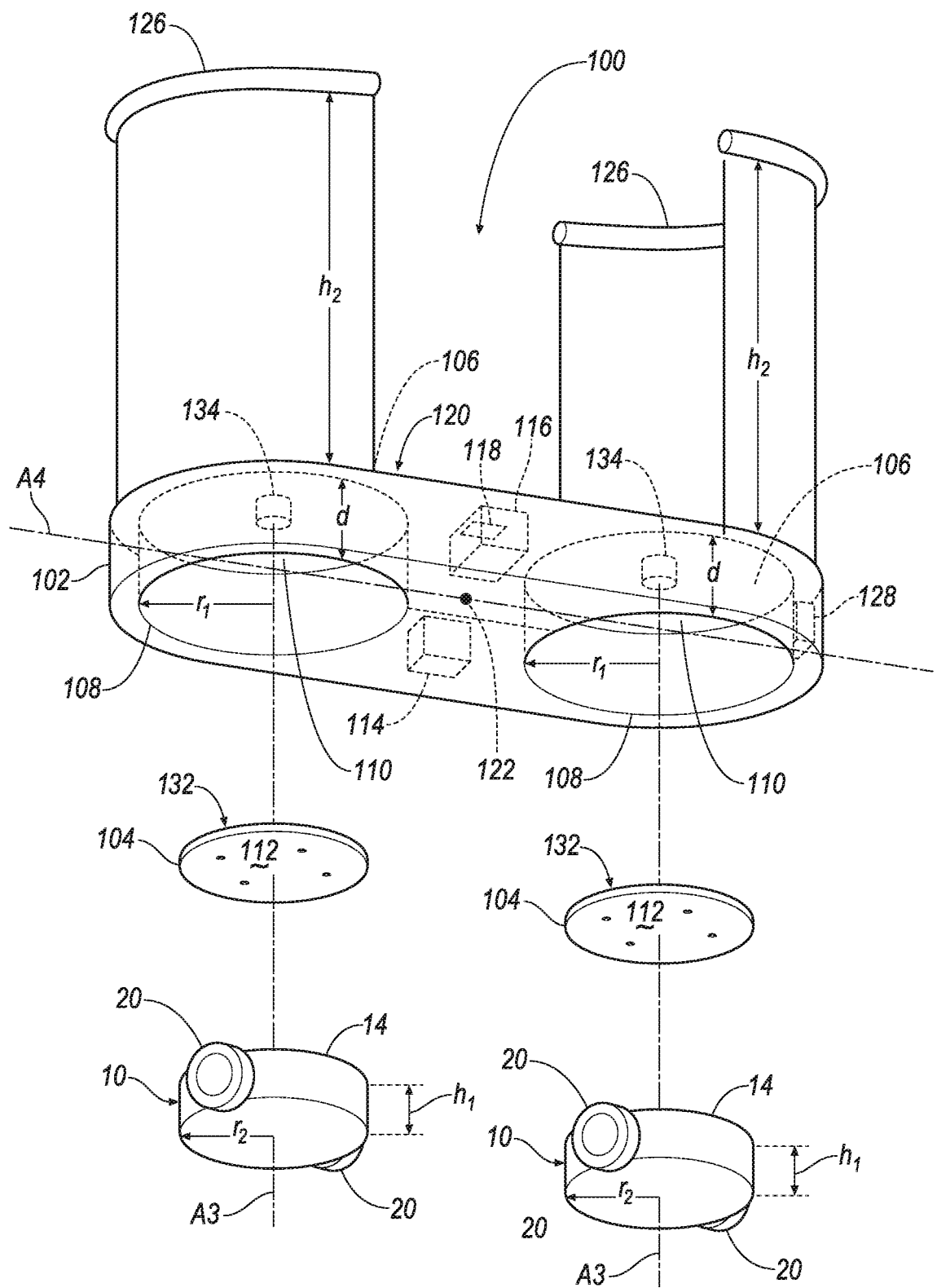

As discussed with reference to FIGS. 12A-12B, the support structure 100 may be placed on top surfaces 14 of multiple devices 10, and as discussed with reference to FIG. 10, a device 10 may have a processor 40 to operate the respective device 10. Additionally, the support structure 100 may further include a processor 114 that is programmed to actuate the transportation device(s) 10 based on a support structure 100 planned path. In the present context, a "planned path" or "route data" include a path for the support structure 100 from a start location to a destination location. A planned path may include location coordinates of points on the path.

The support structure 100 may include a variety of sensors to provide data to the computer processor 114. For example, the sensors may include object detection sensors such as Light Detection And Ranging (LIDAR) sensor(s), camera sensor(s), radar sensor(s), etc., disposed in and/or on the support structure 100 that provide relative locations, sizes, shapes of other objects such as pedestrians, vehicles, buildings, etc.

The processor 114 of the support structure 100 may be programmed to generate an actuation command for a transportation device 10 based on (i) a location of the transportation device 10 relative to a reference point 122 of the support structure 100 and (ii) a planned path of the support structure 100. The processor 114 may be programmed based on conventional motion control techniques to determine actuation commands for the devices 10 and transmit the commands to the devices 10 and/or receive sensor data from the devices 10 via a wired and/or wireless communication network. In the present context, an "actuation command" may include at least one of a propulsion, braking, and/or steering command.

In one example, the processor 114 may operate the support structure 100 in an autonomous mode. For purposes of this disclosure, an autonomous mode is defined as one in which each of propulsion, braking, and steering of the devices 10 are controlled by the processor 114. Additionally or alternatively, the processor 114 may be programmed to receive commands, e.g., to stop, from a human machine interface (HMI 124). The processor 114 may be programmed to receive data including structure 100 location and/or orientation from device(s) 10 sensors 44, objection detection sensors (e.g., camera sensor, LIDAR, radar) included in the support structure 100, and to determine propulsion, braking, and/or steering commands for the devices 10 further based on the planned path.

For example, in order to provide rotational movement of the support structure 100 about an axis A3, the processor 114 may actuate a first device 10 to stop and a second device 10 to navigate in a direction substantially perpendicular to a longitudinal axis A4 of the support structure 100. In another example, to navigate the support structure 100 in a direction of the axis A4, the processor 114 may be programmed to actuate each of the devices 10 to move in a same direction parallel to the direction of axis A4.

The processor 114 may be programmed to receive the planned path of the support structure 100 from a user mobile computing device 52, an HMI 124 of the support structure 100 (as discussed below), etc. Additionally or alternatively, the processor 114 may be programmed to receive destination location coordinates, e.g., GPS location coordinates, and to plan the path (or route) of the support structure 100 based on received map data and the destination location coordinates using known navigation techniques.

Additionally or alternatively, the support structure 100 may lack a processor that sends actuation commands to the devices 10. For example, one of the devices 10 may be programmed to be a "leader" device 10. In the present context, a leader device 10 is a device 10 that may be programmed to perform operations described above with respect to a processor 114. In other words, the processor 40 of the leader device 10 may be programmed to (i) operate the respective device 10 as described with respect to FIG. 10, and (ii) to determine the actuation commands for one or more other devices 10 placed under the support structure 100.

The support structure 100 may include one or more batteries 116 that is/are electrically connectable to at least one of the transportation devices 10. As one example, a battery 116 may be placed between the top and bottom surfaces 120, 102 of the support structure. The support structure 100 battery 116 may provide electrical energy to the processor 114, HMI 124, and/or other electrical components of the support structure 100. Additionally or alternatively, the battery 116 may provide electrical energy to one or more devices 10 through a wired and/or wireless electrical connection to the devices 10. Additionally or alternatively, one or more devices 10 may lack a built-in battery 36 in the respective devices 10 and receive electrical energy from the support structure 100 battery 116.

The support structure 100 may include a charger circuit 118, e.g., a wireless charger circuit 118, that is electrically connected to the battery 116. In one example, the battery 116 may be charged at a depot while the support structure 100 is not in use.

The support structure 100 may include a human machine interface (HMI 124). The HMI 124 may be mounted to a holding member 126 (e.g., a handle). The HMI 124 may include a display, an indicator light, touch pad, switch, etc. The processor 114 may be programmed to actuate the HMI 124 based on at least one of route data, planned path of the support structure 100, support structure 100 reservation status. In the present context, a "reservation status" may include at least one of a "reserved" and "available" state or status. In one example, the status may be "reserved" upon receipt of a message from a mobile computing device 52 including a request to reserve a support structure for a trip.

The processor 114 may be programmed to actuate a light included in an HMI 124 to indicate a location, e.g., a holding member 126, of the support structure 100 to hold (e.g., to indicate that a user may need to hold the holding member 126 to start a ride). In one example, the processor 114 may be programmed to operate the support structure 100 if and only if it is determined that user(s) of the support structure 100 are in an expected (or specified) user state, e.g., holding the holding member(s) 124 with their hand(s). Safety and/or comfort of user(s) during operation of the support structure 100 may thereby be enhanced. In the present context, a "user state" may include information such as (i) whether the user(s) hold a holding member 126, (ii) whether the users sit on the support structure 100, (iii) whether a total weight of users and/or load on the support structure 100 is less than a maximum allowed weight threshold, and/or other conditions.

As discussed with reference to FIGS. 3 and 10, a device 10 may include propulsion components such as the motors 26, 28. Additionally or alternatively, the support structure 100 may include a motor 128 that is drivably connectable to at least one of the devices 10. For example, the motor 128 may be mechanically connectable to a device 10 via a gear that couples the motor 128 to the wheels 20 of the respective device 10. In one example, the device 10 with the wheels 20 mechanically connected to the motor 128 may be fixed relative to the support structure 100, i.e., may not rotate about an axis A3. Thus, a second device 10 that is rotatable via a ball bearing 130 about an axis A3 may steer the support structure 100 whereas the device 10 with wheels 20 mechanically connected to the motor 128 provides propulsion to move the support structure 100.

Figure 13:
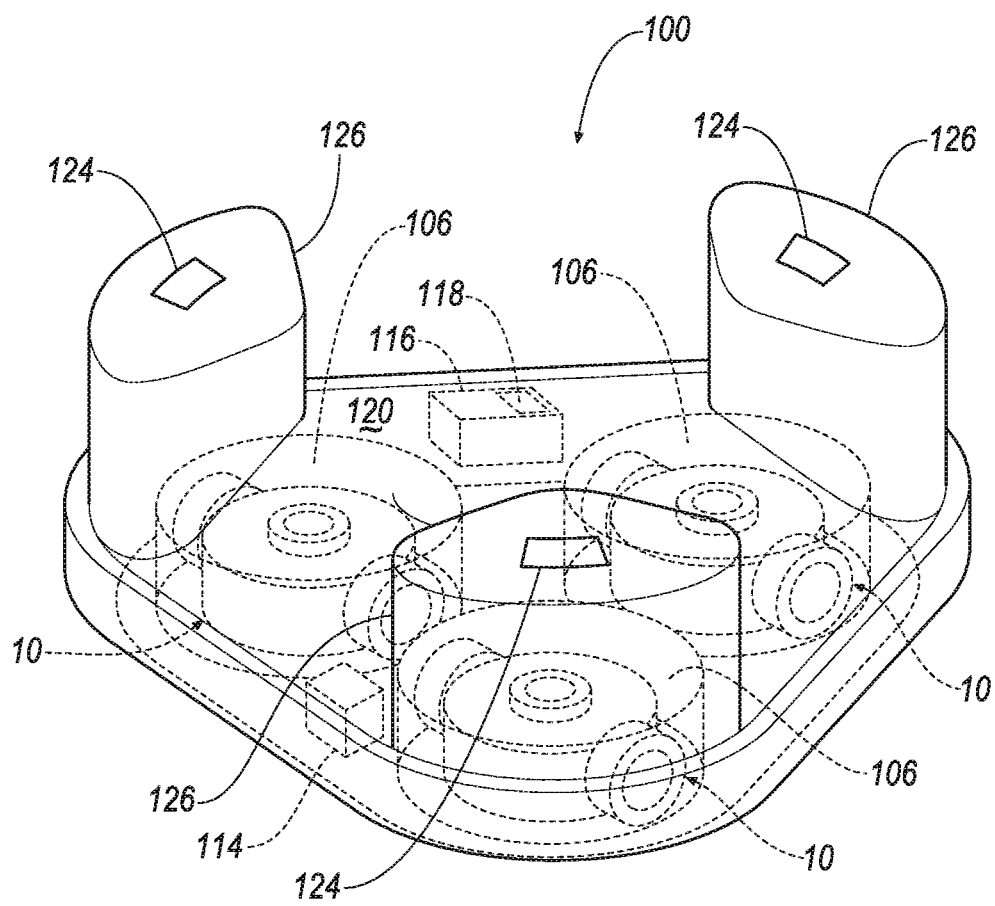
FIG. 13 is a perspective view of an example support structure and three transportation devices.

With reference to FIG. 13, a triangular support structure 100 is illustrated that can be placed on three devices 10. The support structure 100 may have other shapes, e.g., circular, rectangular, etc. while being supported by three devices 10.

Figure 14:
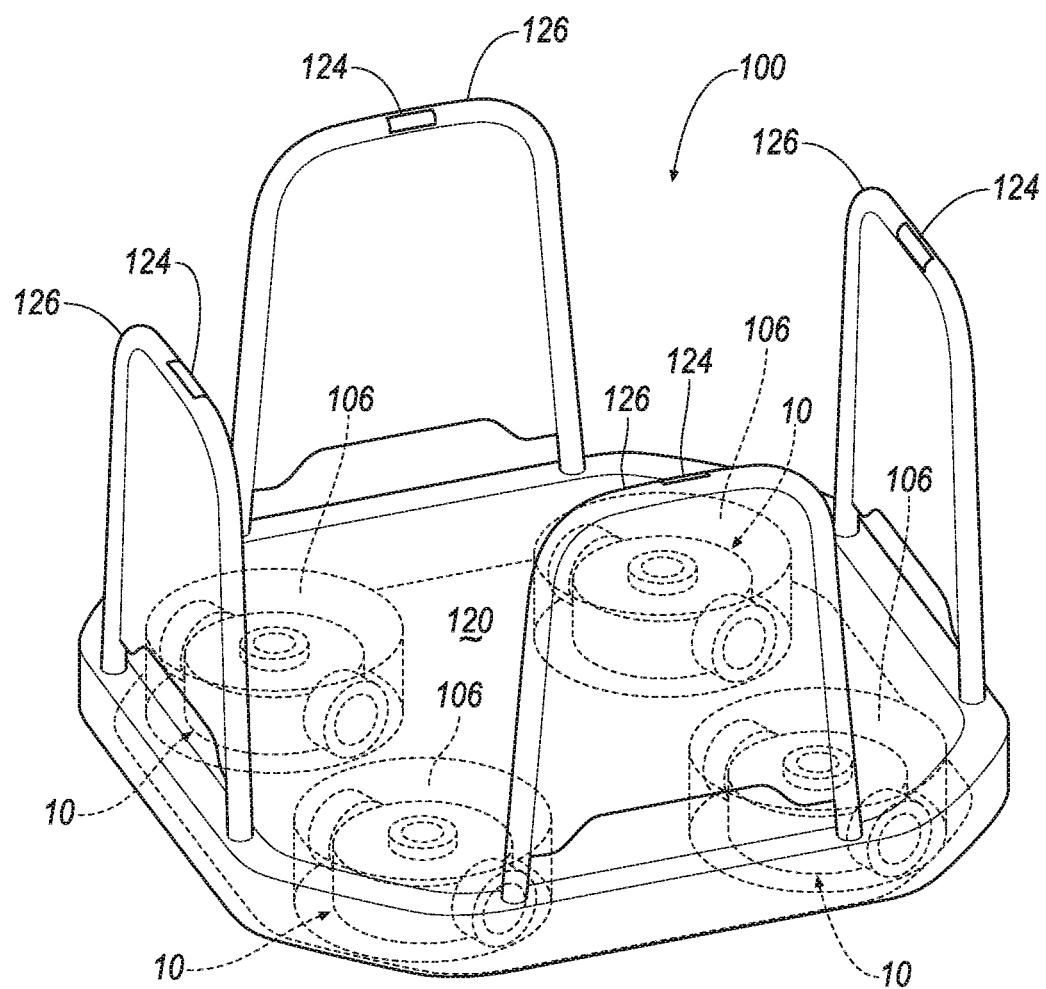
FIG. 14 is a perspective view of an example support structure and four transportation devices.
Figure 15A:
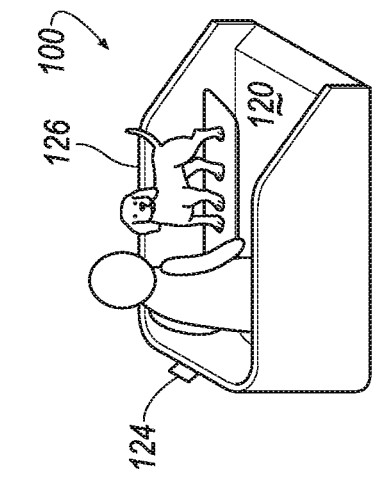
FIGS. 15A-15F show an example of support structure transporting users, pet, and/or loads.
Figure 15B:
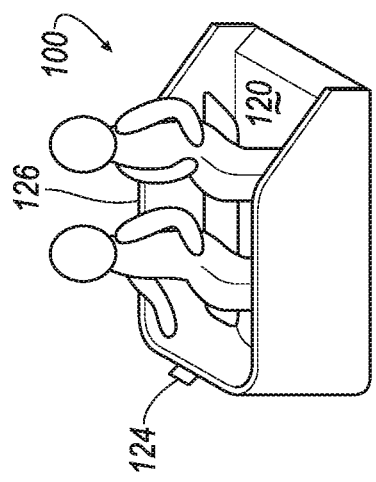
Figure 15C:
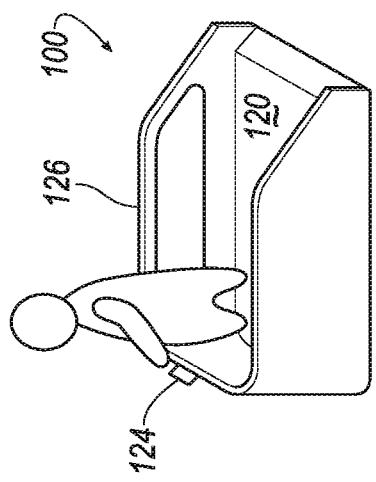
Figure 15D:
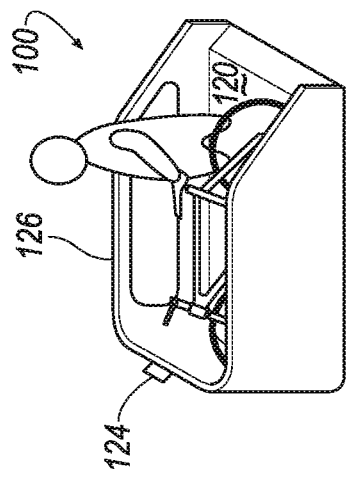
Figure 15E:
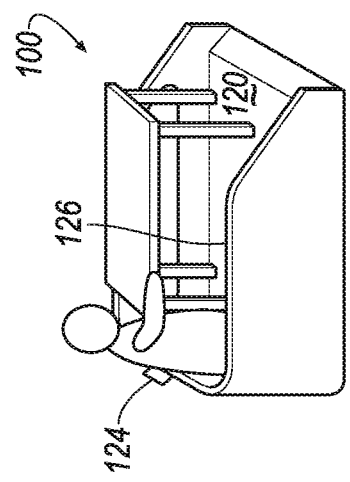
Figure 15F:
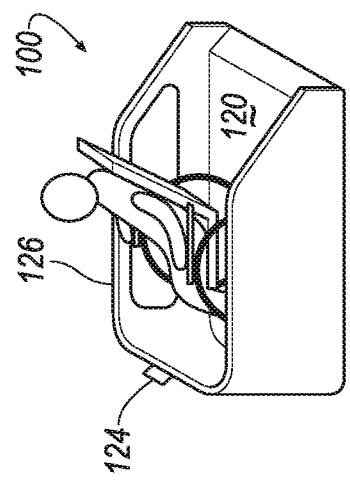

With reference to FIG. 14, a rectangular-shaped example support structure 100 is illustrated that can be placed on four devices 10. The support structure 100 may have other shapes, e.g., circular, triangular, etc. In one example, the support structure 100 may be operated while mounted or placed on four devices 10. In yet another example, although the support structure 100 may have four connector plates 104, the support structure 100 may be placed on and/or be operated by three devices 10. In other words, users may select a number of devices 10 to be placed under the support structure 100 that is less than a number of devices 10 that can be placed under the support structure 100. For example, users may select the number of devices 10 based on weight of loads, number of users, expected speed, etc.

Because multiple devices 10 can be placed under a support structure 100, a device 10 may have two wheels 20 instead of three or four. Although a device 10 with two wheels 20 may not stand or balance on two wheels 20, when multiple devices 10 are places under the support structure 100, then devices 10 with two wheels 20 may be utilized.

FIGS. 15A-15F illustrate multiple example support structures 100 with holding member 126 extending around multiple sides of the support structure 100. Various number of users, pets, loads, etc. may be transported by a support structure 100. A shape and/or dimensions of the support structure 100 may be designed based on a number of expected users, loads, etc.

Additionally or alternatively, as shown in FIGS. 15A-15F, the support structure 100 may include a foldable bench (or chair) for a user and/or pet.

Figure 16:
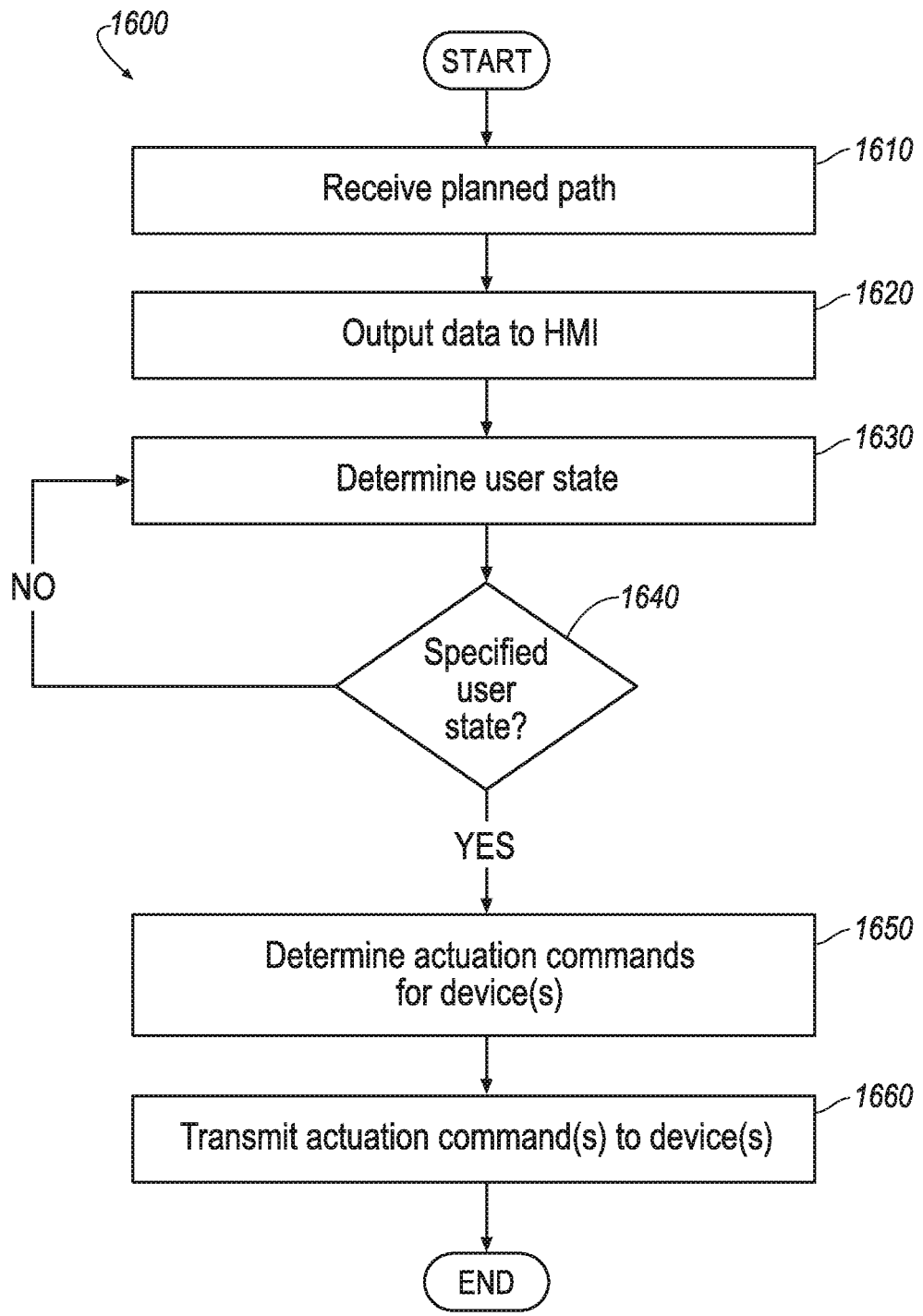
FIG. 16 is a flowchart of a method for operating the support structure.

FIG. 16 shows an example process 1600 for operating a support structure 100. For example, the processor 114 may be programmed to execute blocks of the process 1600. Additionally or alternatively, a device 10 processor 40 may be programmed to execute blocks of the process 1600.

The process 1600 begins in a block 1610, in which the processor 114 receives a planned path. In one example, the processor 114 may be programmed to receive the planned path from a mobile computing device 52. In another example, the processor 114 may be programmed to receive destination location coordinates, e.g., via the HMI 124, and to plan the path based on the received destination coordinates using known navigation techniques.

Next, in a block 1620, the processor 114 can output data to the HMI 124. (Alternatively, the block 1620 could be omitted.) For example, the processor 114 may be programmed to output a message to the HMI 124 indicating a request to hold or grasp a holding member 126, e.g., a handrail around the support structure 100. Additionally or alternatively, the processor 114 may be programmed to output a destination location of the support structure 100 to the HMI 124. Additionally or alternatively, the processor 114 may be programmed to activate an HMI 124 light or display (e.g., a screen displaying text) indicating a reservation status of the support structure 100.

Next, in a block 1630, the processor 114 determines a state of one or more users. The processor 114 may be programmed to determine whether user is holding or grasping the holding member 126, a user weight, and/or loads less than a maximum allowed weight, etc., based on data received from sensors (e.g., a camera sensor) included in the support structure 100 and/or device(s) 10.

Next, in a decision block 1640, the processor 114 determines whether the user(s) is/are in an expected or specified state, e.g., holding the holding members 124, and/or a weight being less than a maximum allowed weight threshold, etc. If the processor 114 determines that the user(s) is/are in the expected state, then the process 1600 proceeds to a block 1650; otherwise the process 1600 returns to the block 1630.

In the block 1650, the processor 114 determines actuation commands for the device(s) 10. The processor 114 may be programmed to determine the actuation commands based on the data received from the device 10 sensors, HMI 124, mobile computing device 52, etc. An actuation command may include at least one of a propulsion, braking, and/or steering command. As explained above, the processor 114 may be programmed to receive data including structure 100 location and/or orientation from device(s) 10 sensors 44, objection detection sensors (e.g., camera sensor, LIDAR, radar) included in the support structure 100, and to determine propulsion, braking, and/or steering commands for the devices 10 further based on the planned path.

Next, in a block 1660, the processor 114 transmits the actuation command to the device(s) 10, which can then actuate one or more components as specified by the transmitted command. Following the block 1660, the process 1600 ends, or alternatively, returns to the block 1610, although not shown in FIG. 16.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising:
a support structure that includes:
a bottom surface;
a connector plate pivotably connected to the bottom surface;
a processor that is programmed to:
generate an actuation command for a device based on (i) a location of the device relative to a reference point of the support structure and (ii) a planned path of the support structure; and
actuate the device based on the generated actuation command; and
the device including a wheel, the device being releaseably connectable to the connector plate.

2. The system of claim 1, wherein the support structure further includes two or more circular recesses; each recess having (i) a first open end at the bottom surface of the support structure and (ii) a second end pivotably connected to the connector plate.

3. The system of claim 2, wherein the connector plate is pivotable about a longitudinal axis of the recess; the longitudinal axis being perpendicular to the bottom surface of the support structure.

4. The system of claim 1, wherein a top surface of the device touches the connector plate.

5. The system of claim 1, wherein the support structure further includes a battery that is electrically connectable to the device.

6. The system of claim 5, wherein the support structure further includes a wireless charger circuit that is electrically connected to the battery.

7. The system of claim 1, wherein the support structure further includes a motor that is drivably connectable to the device.

8. The system of claim 1, wherein the support structure further includes a human machine interface and a processor programmed to actuate the human machine interface based on at least one of route data, planned path of the support structure, support structure reservation status.

9. The system of claim 8, wherein the human machine interface includes a light, and the processor is further programmed to actuate the light to indicate a location of a holding member of the support structure.

10. The system of claim 1, wherein the support structure further includes a second connector plate pivotably connected to the bottom surface, and a second device including a second wheel, the second device being releaseably connectable to the second connector plate.

11. A system, comprising a support structure that includes:
a bottom surface,
a connector plate pivotably connected to the bottom surface,
a device including a wheel, the device being releaseably connectable to the connector plate;
a human machine interface;
a light; and
a processor, programmed to:
actuate the human machine interface based on at least one of route data, planned path of the support structure, support structure reservation status; and
actuate the light to indicate a location of a holding member of the support structure.

* * * * *